United States Patent [19]
Sano et al.

[11] Patent Number: 5,993,525
[45] Date of Patent: Nov. 30, 1999

[54] RECORDING LIQUID

[75] Inventors: Hideo Sano; Masahiro Yamada, both of Kanagawa, Japan

[73] Assignee: Mitsubishi Chemical Corporation, Tokyo, Japan

[21] Appl. No.: 09/038,849

[22] Filed: Mar. 12, 1998

[30] Foreign Application Priority Data

Mar. 17, 1997 [JP] Japan ................... 9-062971
Sep. 29, 1997 [JP] Japan ................... 9-263341

[51] Int. Cl.$^6$ .......................................... C09D 11/02
[52] U.S. Cl. .......................... 106/31.48; 534/803
[58] Field of Search ................... 106/31.48, 31.5; 534/803

[56] References Cited

U.S. PATENT DOCUMENTS

| | | | |
|---|---|---|---|
| 4,804,411 | 2/1989 | Eida et al. | 106/31.48 |
| 5,262,527 | 11/1993 | Gregory et al. | 106/31.48 |
| 5,374,301 | 12/1994 | Gregory et al. | 106/31.48 |
| 5,383,960 | 1/1995 | Gregory et al. | 106/31.48 |
| 5,473,053 | 12/1995 | Kenyon et al. | 106/31.48 |
| 5,609,673 | 3/1997 | Takimoto et al. | 106/31.48 |
| 5,616,694 | 4/1997 | Kenyon et al. | 106/31.48 |

FOREIGN PATENT DOCUMENTS

| | | |
|---|---|---|
| 62-246974 | 10/1987 | Japan . |
| 4279671 | 10/1992 | Japan . |
| 6329933 | 11/1994 | Japan . |
| 7-90212 | 4/1995 | Japan . |
| 8218021 | 8/1996 | Japan . |
| 9216873 | 8/1997 | Japan . |
| 9217016 | 8/1997 | Japan . |
| 9416021 | 7/1994 | WIPO . |

*Primary Examiner*—Helene Klemanski
*Attorney, Agent, or Firm*—Sughrue, Mion, Zinn, Macpeak & Seas, PLLC

[57] ABSTRACT

A recording liquid is disclosed comprising an aqueous medium and at least one dye selected from the dyes of which free acid form is represented by the following formula (I):

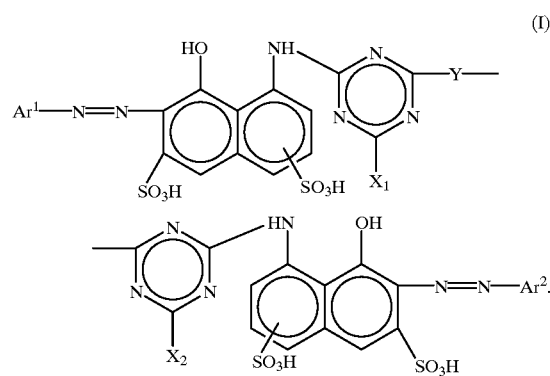

13 Claims, No Drawings

RECORDING LIQUID

FIELD OF THE INVENTION

The present invention relates to a recording liquid, more specifically, the present invention relates to a recording liquid suitable for the ink jet recording.

BACKGROUND OF THE INVENTION

A so-called ink jet recording method of performing recording by splashing liquid drops of a recording liquid containing a water-soluble dye such as a direct dye and an acidic dye, through fine jetting orifices are being used in practice.

The recording liquid is required to be fixed rapidly on a recording sheet commonly used for general office works, such as PPC (plain paper copier) for electrophotographic sheet and fanfold paper (continuous form for computers or the like), to provide a printed matter having good printing appearance grade, namely, a clearly outlined printed letter free of blurring, and to have excellent stability during storage as a recording liquid. Accordingly, the solvent which can be used is extremely limited.

On the other hand, the dye for use in the recording liquid is required to have a sufficiently high solubility in the above-described limited solvents, to be stable during a long-term storage as a recording liquid, to provide a printed image having a high density and to have excellent water resistance and light fastness. These requirements are, however, difficult to satisfy all at the same time.

To overcome the difficulties, various proposals have been presented (for example, see JP-A-61-101574 (the term "JP-A" as used herein means an "unexamined published Japanese patent application"), JP-A-61-101576, JP-A-61-195176, JP-A-61-62562, JP-A-61-247771, JP-A-62-156168, JP-A-62-246974, JP-A-63-63765, JP-A-63-295685, JP-A-1-123866, JP-A-1-240584, JP-A-2-16171, JP-A-3-122171, JP-A-3-203970, JP-A-4-153272). However, the requirements on the market have not yet been fully satisfied.

JP-A-4-279671 and PCT International Publication WO 94/16021 teach that a dye having a structure such that two molecules of a specific monoazo-base dye having a triazinyl group are connected through a divalent organic bond group can be used for the ink jet recording.

However, in the former publication, the divalent organic bond group as a linking group does not play an important role and only linking groups such as (substituted) phenylenediamine are described as the example thereof. These linking groups have a planar structure and when a dye having such a linking group is used, the recorded image is inferior in the coloring property and a sufficiently high color density is not achieved.

Further, the group has a conjugated system and when this group is present, a deep color tone is presented and a deeply blue-tinted color results. Furthermore, the group (the group represented by Z and corresponding to the group represented by $x_1$ or $X_2$ in the present invention) bonded to the triazinyl group is preferably a group of which N atom is directly bonded to the triazinyl group, such as $NHC_2H_4OH$ and morpholino group, and in the Examples, only dyes having such a structure are used. This type of dye also has a tendency to decrease in the saturation of the image color.

In the latter publication, the divalent organic bond group as a linking group is a (substituted) phenylenediamine group or a substituted piperazine group. Of these divalent organic bond groups, the (substituted) phenylenediamine group is not preferred because of the reasons described above. Further, when substituted piperazine is used as the divalent organic bond group, the dye is deficient in the light fastness and the water resistance as specifically verified later in Comparative Example 2.

JP-A-8-218021 teaches that a dye having a structure such that two molecules of a specific monoazo-base dye having a triazinyl group are connected through a divalent organic bond group can be used for the ink jet recording. However, the structure of the linking group differs from that of the present invention and the dye is low in the reliability and fails to provide the light fastness and color tone of a satisfactory level.

SUMMARY OF THE INVENTION

The object of the present invention is to provide a magenta color recording liquid suitable for the ink jet recording or as a writing instrument and advantageous in that good printing appearance grade is attained even in the case of recording on a plain paper, the image recorded has a high density, the light fastness, particularly the water resistance and color tone of the recorded image are excellent, and the stability during a long-term storage is good.

The magenta dye conventionally used for the recording liquid is a commercially available dye having good water resistance and since the recording material is predominantly paper, having a high affinity for cellulose, namely, a high substantivity (direct dye). However, this dye presents an unclear color tone. On the other hand, the acidic dye gives a clear color tone but is inferior in the water resistance. Thus, development of a magenta dye satisfying both the color tone and the water resistance is being keenly demanded.

The present inventors have proposed a dye (JP-A-8-218021) capable of overcoming these problems by selecting the divalent linking group or the substituent of the triazinyl group in a dye having a structure such that two molecules of a monoazo-base dye having a triazinyl group are connected through a divalent organic bond group. And, it has been verified that when a dye further improved in the above-described structure is used as a recording liquid component, requirements in both the color tone and the water resistance are satisfied and the object of the present invention can be attained. As a result, the present invention has been accomplished. More specifically, the present invention provides a recording liquid comprising an aqueous medium and at least one dye selected from the dyes of which free acid form is represented by the following formula (I):

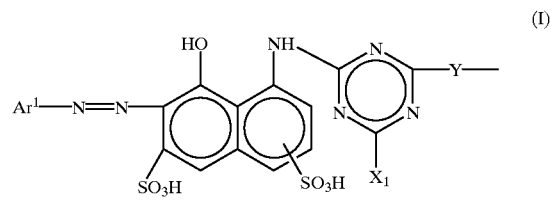

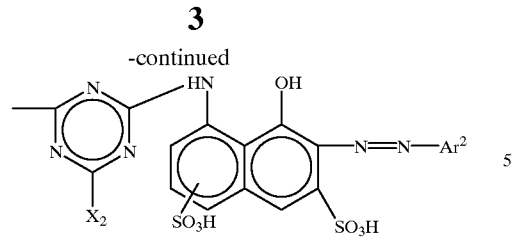

wherein Ar$^1$ and Ar$^2$ each independently represents a substituted or unsubstituted phenyl group or a substituted or unsubstituted naphthyl group; X$_1$ and X$_2$ each represents —OR$_1$, —NR$_2$R$_3$ or a chlorine atom; R$_1$, R$_2$ and R$_3$ each represents a hydrogen atom, an alkyl group having from 1 to 8 carbon atoms, an alkenyl group having 2 or 3 carbon atoms, an aryl group, an aralkyl group, a cyclohexyl group or a nitrogen-containing heterocyclic group, provided that these groups exclusive of the hydrogen atom each may have at least one substituent and R$_2$ and R$_3$ may form a 5- or 6-membered ring together with the nitrogen atom bonded thereto; and Y represents a divalent linking group selected from the groups represented by the following formulae (II) to (IV) and the groups in Group A:

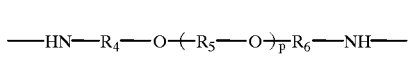
(II)

wherein R$_4$ and R$_6$ each independently represents a linear or branched alkylene group having from 1 to 8 carbon atoms; R$_5$ represents a linear or branched alkylene group having from 1 to 12 carbon atoms or the following formula (a):

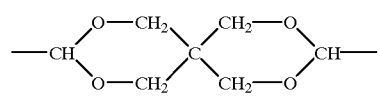
(a)

and p represents a number of from 0 to 20,

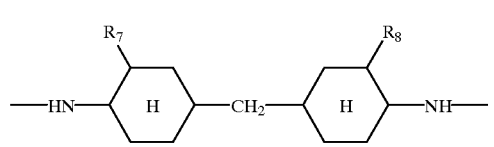
(III)

wherein R$_7$ and R$_8$ each represents a hydrogen atom or a methyl group,

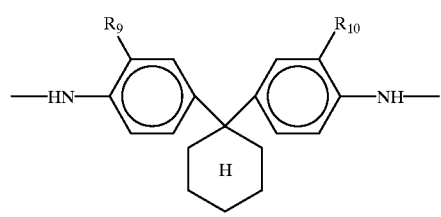
(IV)

wherein R$_9$ and R$_{10}$ each represents a hydrogen atom, a methyl group or a methoxy group,

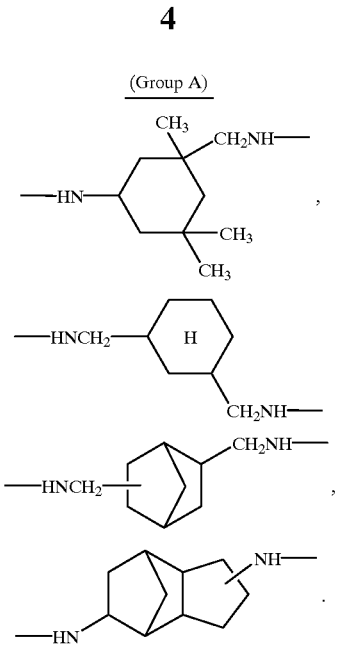
(Group A)

DETAILED DESCRIPTION OF THE INVENTION

The present invention is described in detail below.

The dye for use in the present invention is a dye of which free acid form is represented by formula (I) shown above.

Examples of the substituent for Ar$^1$ or Ar$^2$ in formula (I) include a substituted or unsubstituted alkyl group having from 1 to 9 carbon atoms (e.g., methyl, ethyl, n-propyl, isopropyl, n-butyl, 2-ethylhexyl, trifluoromethyl, dimethylaminomethyl), a substituted or unsubstituted alkoxy group having from 1 to 9 carbon atoms (e.g., methoxy, isopropoxy, n-butoxy, chloroethoxy), a halogen atom (e.g., fluorine, chlorine, bromine), a hydrogen atom, a hydroxyl group, a substituted or unsubstituted carbamoyl group (e.g., carbamoyl, N,N-dimethylcarbamoyl, phenylcarbamoyl), a substituted or unsubstituted sulfamoyl group (e.g., sulfamoyl, N-methyl-sulfamoyl, N-ethylsulfamoyl, N-ethyl-N-phenylsulfamoyl, N,N-dimethylsulfamoyl, p-carboxyphenylsulfamoyl), a substituted or unsubstituted amino group (e.g., N-methylamino, carbamoylamino, N,N-diethylamino, acetylamino, N-methyl-N-acetylamino), a nitro group, a sulfonic acid ester group (e.g., phenoxysulfonyl), a sulfonyl group (e.g., hydroxyethylsulfonyl, benzylsulfonyl), a sulfo group, a carboxyl group and a carboxylic acid ester group (e.g., methoxycarbonyl).

X$_1$ and X$_2$ each represents a group of —OR$_1$ or —NR$_2$R$_3$ or a chlorine atom. Examples of the substituent represented by R$_1$ include a hydrogen atom, a substituted or unsubtituted alkyl group having from 1 to 8 carbon atoms (e.g., methyl, ethyl, n-butyl, n-octyl, ethylhexyl, isopropyl, tert-butyl, carboxymethyl), a substituted or unsubstituted alkenyl group having 2 or 3 carbon atoms (e.g., vinyl, allyl), an aryl group (e.g., phenyl, 4-nitrophenyl, 4-butylphenyl, 4-carboxyphenyl), an aralkyl group (e.g., benzyl, phenethyl), a cyclohexyl group and a nitrogen-containing heterocyclic group (e.g., pyridyl).

Examples of the substituent represented by R$_2$ or R$_3$ include a hydrogen atom, a substituted or unsubstituted alkyl group having from 1 to 8 carbon atoms (e.g., methyl, ethyl, n-butyl, n-octyl, ethylhexyl, isopropyl, tert-butyl, hydroxyethyl), a substituted or unsubstituted alkenyl group having 2 or 3 carbon atoms (e.g., vinyl, allyl), an aryl group (e.g., phenyl, 4-nitrophenyl, 4-butylphenyl), an aralkyl group (e.g., benzyl, phenethyl), a cyclohexyl group and a nitrogen-containing heterocyclic group (e.g., pyridyl).

Examples of the 5- or 6-membered ring formed by $R_2$ and $R_3$ together with the nitrogen atom bonded include a morpholine ring, piperazine ring and a piperidine ring.

Y represents a divalent bond group selected from the groups represented by formulae (II) to (IV) and the groups in Group A. In formula (II), $R_4$ and $R_6$ each represents a linear or branched alkylene group having from 1 to 8, preferably from 2 to 4 carbon atoms (e.g., ethylene, propylene, trimethylene), $R_5$ represents a linear or branched alkylene group having from 1 to 12, preferably from 2 to 8 carbon atoms (e.g., ethylene, propylene, butylene, hexylene) or the following formula (a), and p preferably represents a number of from 0 to 10.

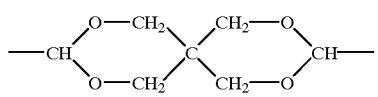

(a)

The dye of the present invention has the above-described linking group and therefore, ensures excellent reliability as compared with the dye described in JP-A-8-218021. Note here that among the linking groups represented by formulae (II) to (IV) and in Group A, the linking group represented by formula (II) has a structure analogous to that of the water-soluble organic solvent contained in the aqueous medium and therefore, the dye having this linking group is considered to be preferred in view of the reliability.

Of the dyes represented by formula (I), a dye where each of the naphthyl groups represented by $Ar^1$ or $Ar^2$ has at least one group selected from a sulfo group and a carboxyl group as a substituent is preferred. The total number of the sulfo group or groups and the carboxyl group or groups substituted on each of the naphthyl groups represented by $Ar^1$ or $Ar^2$ is preferably from 1 to 7.

The dye represented by formula (I) is preferably a dye represented by the following formula (I'):

Examples of the substituent represented by $R_{11}$, $R_{12}$, $R_{13}$, $R_{14}$, $R_{15}$ or $R_{16}$ in formula (I') include a substituted or unsubstituted alkyl group having from 1 to 9 carbon atoms (e.g., methyl, ethyl, n-propyl, isopropyl, n-butyl, 2-ethylhexyl, trifluoromethyl, dimethylaminomethyl), a substituted or unsubstituted alkoxy group having from 1 to 9 carbon atoms (e.g., methoxy, isopropoxy, n-butoxy, chloroethoxy), a halogen atom (e.g., fluorine, chlorine, bromine), a hydrogen atom, a hydroxyl group, a substituted or unsubstituted carbamoyl group (e.g., carbamoyl, N,N-dimethylcarbamoyl, phenylcarbamoyl), a substituted or unsubstituted sulfamoyl group (e.g., sulfamoyl, N-methylsulfamoyl, N-ethylsulfamoyl, N-ethyl-N-phenyl-sulfamoyl, N,N-dimethylsulfamoyl, p-carboxyphenylsulfamoyl), a substituted or unsubstituted amino group (e.g., N-methylamino, carbamoylamino, N,N-diethylamino, acetylamino, N-methyl-N-acetylamino), a nitro group, a sulfonic acid ester group (e.g., phenoxysulfonyl), a sulfonyl group (e.g., hydroxyethylsulfonyl, benzylsulfonyl), a carboxyl group and a carboxylic acid ester group (e.g., methoxycarbonyl).

Among the dyes represented by formula (I'), dyes having a structure such that the number of carboxyl groups in $R_{11}$ to $R_{16}$ is 3 or less are generally preferred in view of water resistance.

m and n each is preferably 0 or 1.

When m and n each is 0 or 1, at least one of $R_{11}$, $R_{12}$ and $R_{13}$ and at least one of $R_{14}$, $R_{15}$ and $R_{16}$ are preferably a group other than a hydrogen atom.

A dye having a structure such that in formula (I'), when m and n each is 1, the $SO_3H$ group bonded to the phenyl group is in the ortho-position to the bonding site of the azo group, is more preferred.

A dye having a structure such that in formula (I'), when m and n each is 0, at least one of $R_{11}$, $R_{12}$ and $R_{13}$ and at least one of $R_{14}$, $R_{15}$ and $R_{16}$ are a hydrogen atom, at least one of $R_{11}$, $R_{12}$ and $R_{13}$ and at least one of $R_{14}$, $R_{15}$ and $R_{16}$ are a group selected from a trifluoromethyl group, a substituted or unsubstituted sulfamoyl group, a lower alkyl (hereinafter, the term "lower alkyl", means an "alkyl group having from 1 to 4 carbon atoms") eater group of sulfonic acid, an aryl ester group having from 6 to 12 of sulfonic acid, a COOH group and a lower alkyl ester group of carboxylic acid, and the site of these groups bonded to respective phenyl groups is in the ortho-position to the bonding site of the azo group, is preferred.

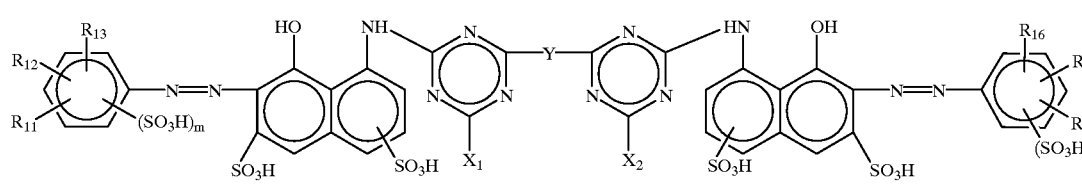

(I')

wherein $R_{11}$, $R_{12}$, $R_{13}$, $R_{14}$, $R_{15}$ and $R_{16}$ each independently represents a substituted or unsubstituted alkyl group having from 1 to 9 carbon atoms, a substituted or unsubstituted alkoxy group having from 1 to 9 carbon atoms, a halogen atom, a hydrogen atom, a hydroxyl group, a substituted or unsubstituted carbamoyl group, a substituted or unsubstituted sulfamoyl group, a substituted or unsubstituted amino group, a nitro group, a sulfonic acid ester group, a sulfonyl group, a carboxyl group or a carboxylic acid ester group; m an n each represents a number of 0, 1 or 2; and $X_1$, $X_2$ and Y have the same meanings as defined in formula (I).

Further, a dye having a structure such that in formula (I'), the groups of formulae:

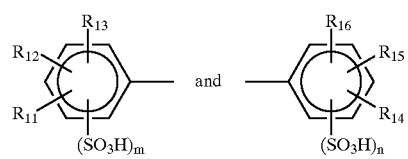

are the groups of formulae:

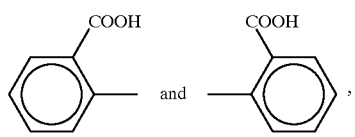

respectively, is preferred.

Furthermore, a dye having a structure such that in formula (I), $X_1$ and $X_2$ each is an OH group and the groups of formulae:

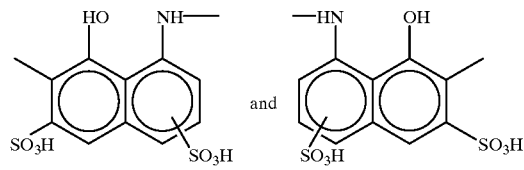

are the groups of formulae:

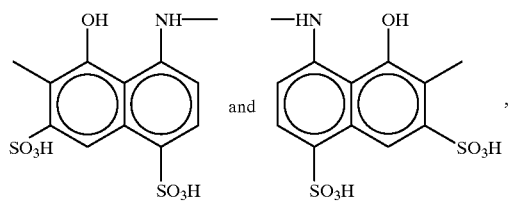

or the groups of formulae:

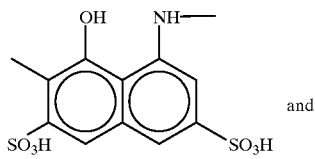

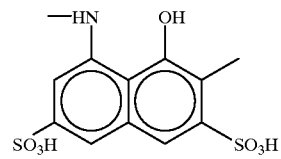

respectively, is also preferred.

Among the dyes represented by formula (I'), a dye of which free acid form has a structure laterally symmetrical with respect to the linking group Y as represented by the following formula (V) is preferred. This dye is advantageous in view of the color tone, the water resistance and the practicability.

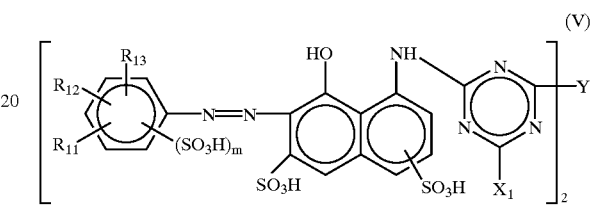

(V)

wherein $R_{11}$, $R_{12}$, $R_{13}$, $X_1$, m and Y have the same meanings as in formula (I').

The dye represented by formula (I) for use in the present invention may be used as it is in the form of a free acid (structure of formula (I)) and also may be used in the form of a salt. Further, the dye may have a structure where a part of the free acid group is in the form of a salt, or a salt form dye and a free acid form dye may be used in combination. Examples of the salt form include a salt of an alkali metal such as Na, Li and K, a salt of an ammonium which may be substituted by an alkyl group or a hydroxyalkyl group, and a salt of an organic amine. Examples of the organic amine include a lower alkylamine, a hydroxy-substituted lower alkylamine, a carboxy-substituted lower alkylamine, and a polyamine having from 2 to 10 alkyleneimine units each having from 2 to 4 carbon atoms. The salt is not limited to one kind but a mixture of plural kinds of salts may be present.

Specific examples of the dye include the dyes having the following chemical structure Nos. (1) to (52).

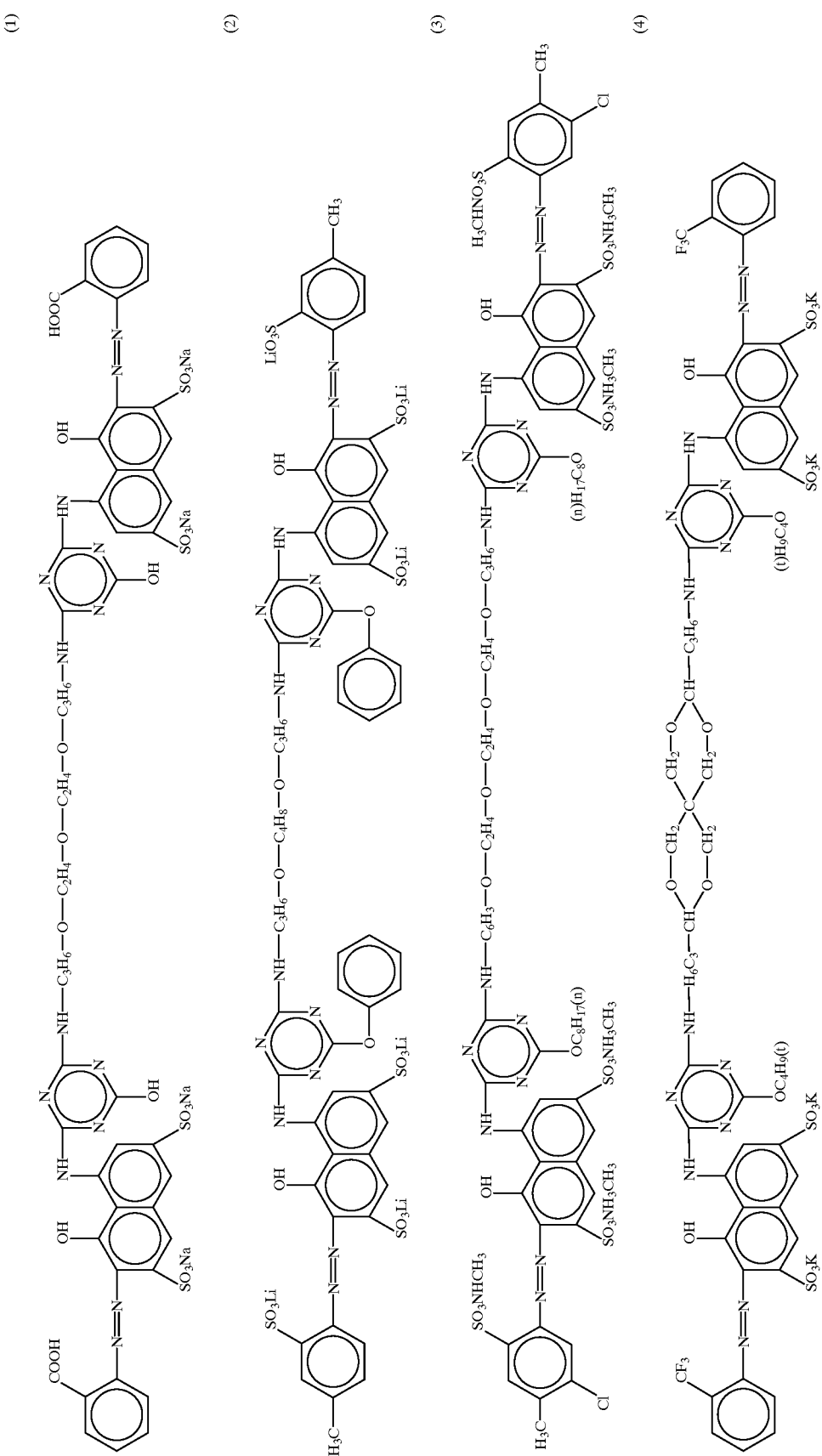

(5) 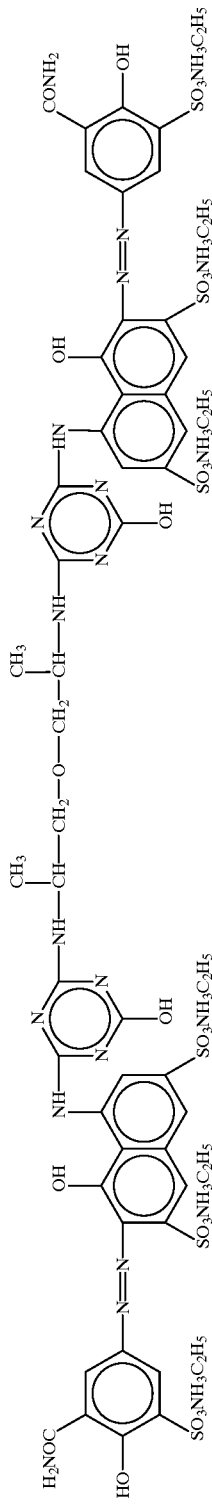
(6) 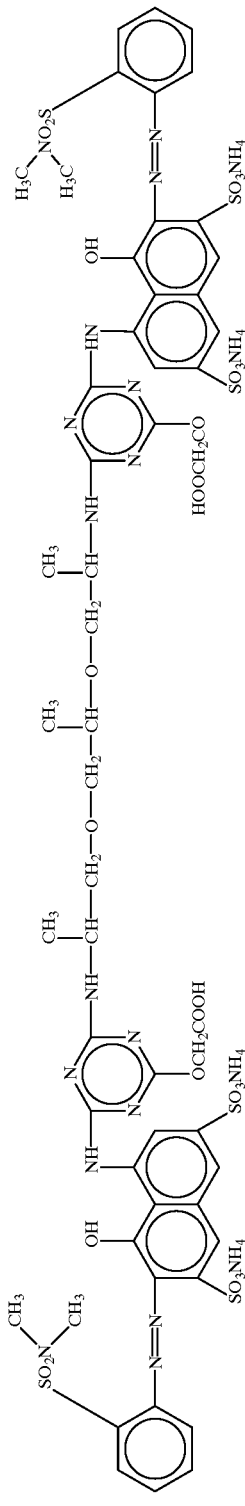
(7) 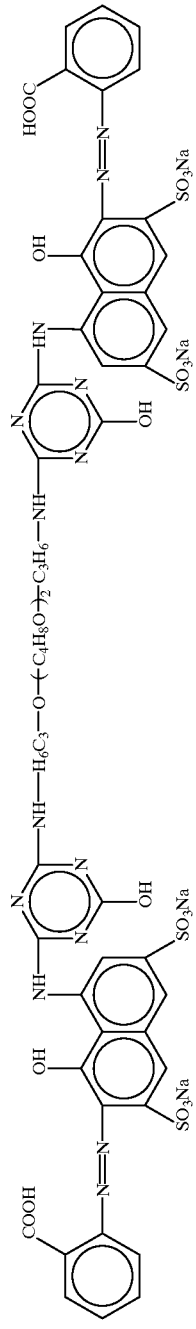
(8) 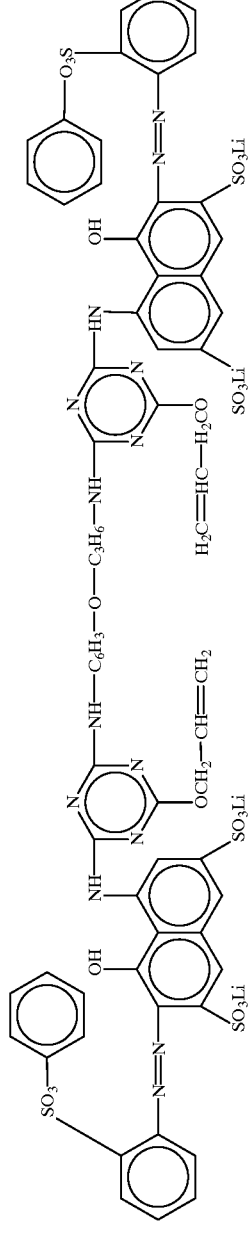

-continued
(9) 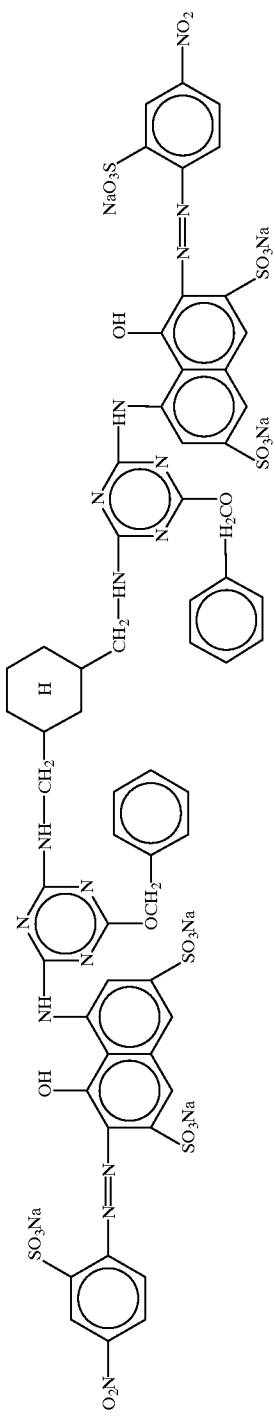
(10) 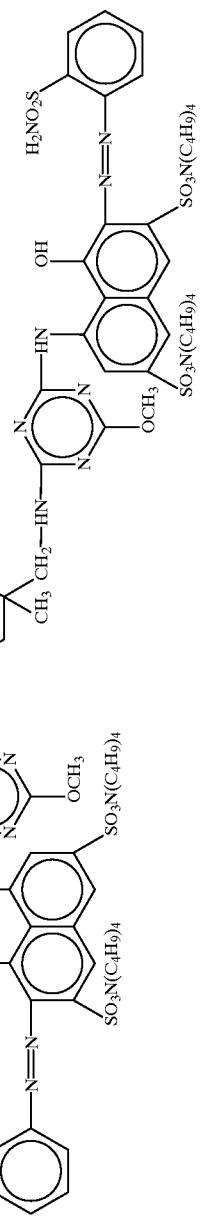
(11) 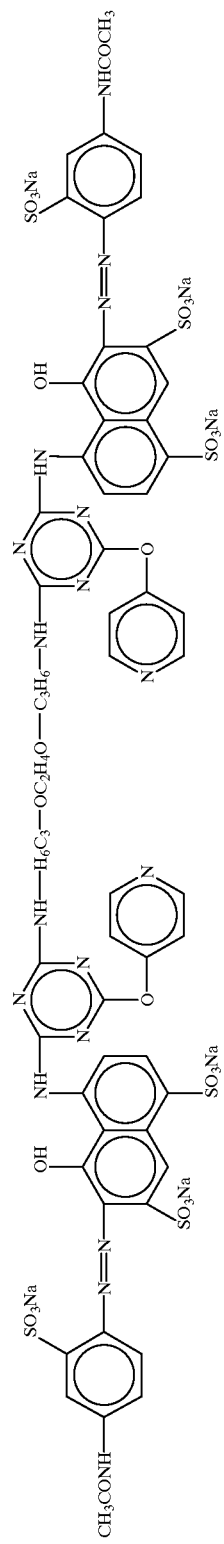

(12) (13) (14)
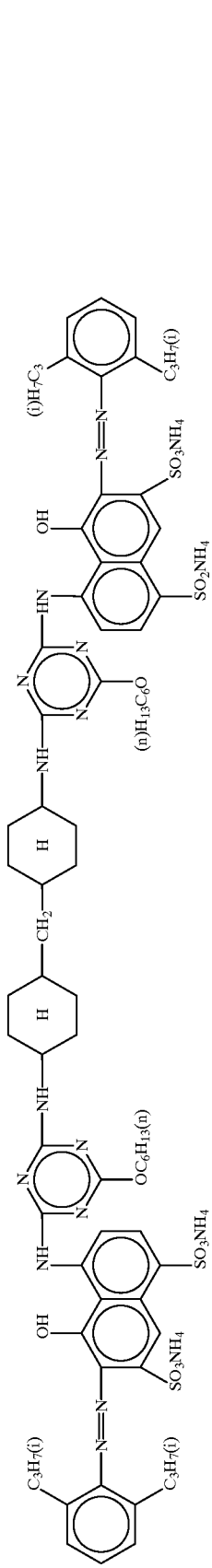
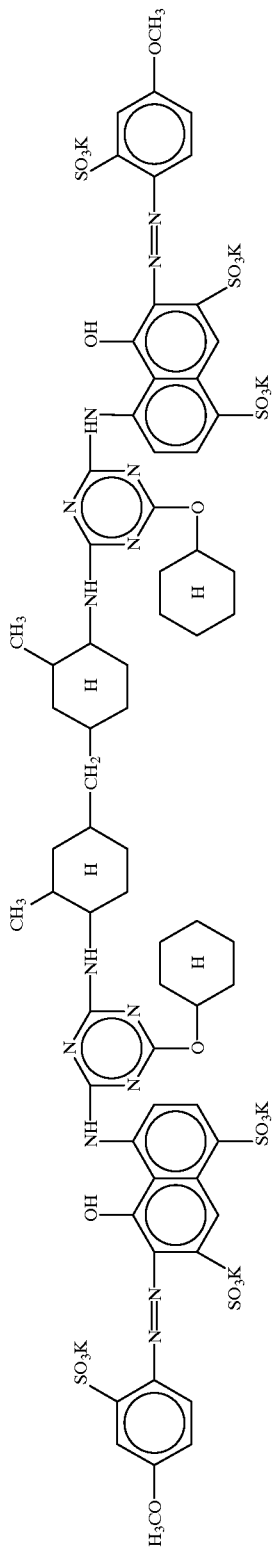
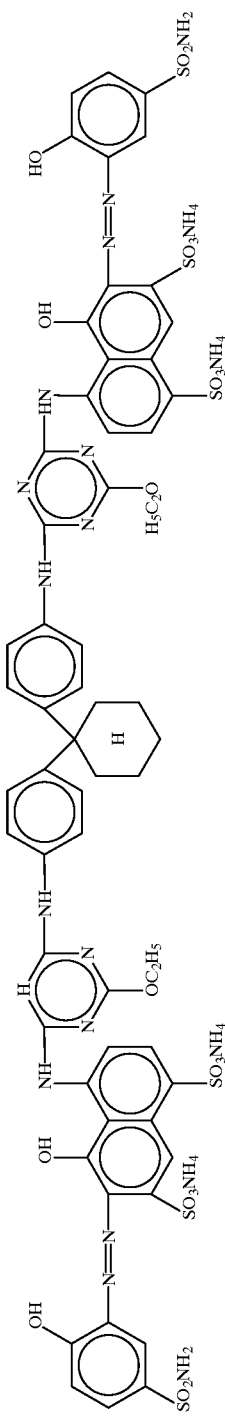

(15)
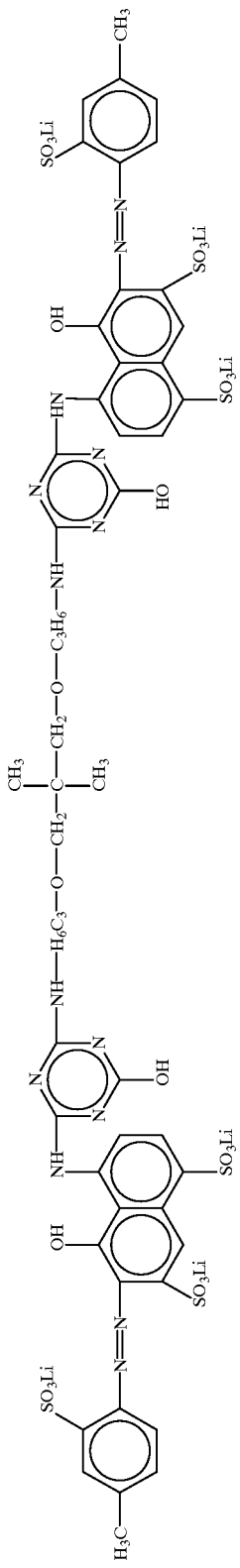
(16)
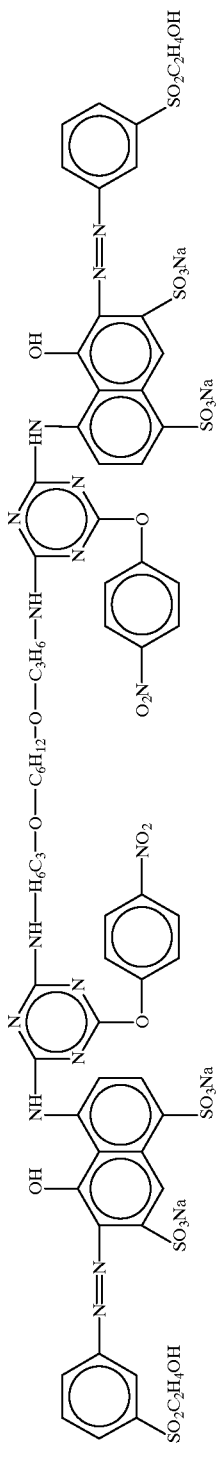
(17)
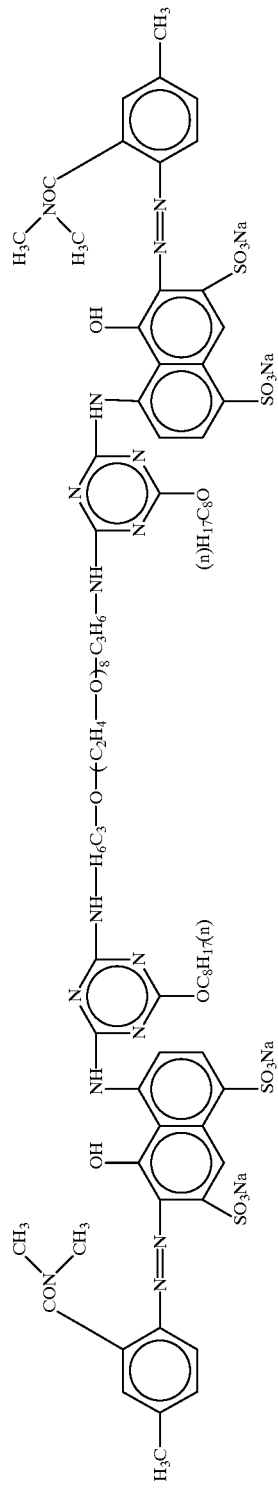

-continued
(18) 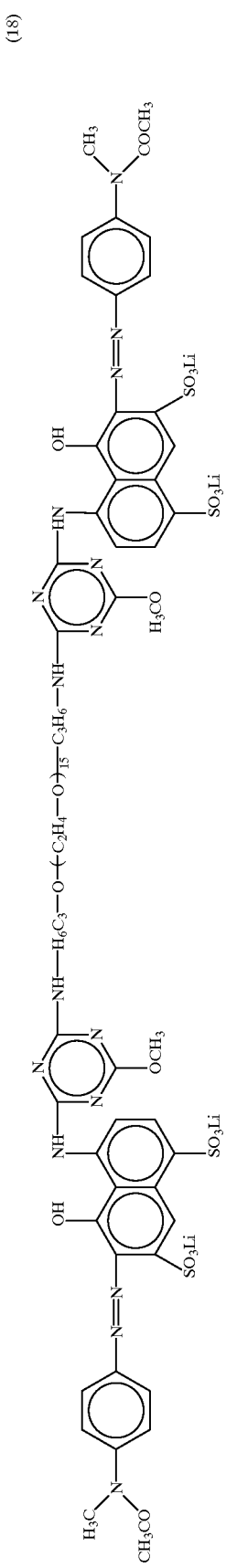
(19) 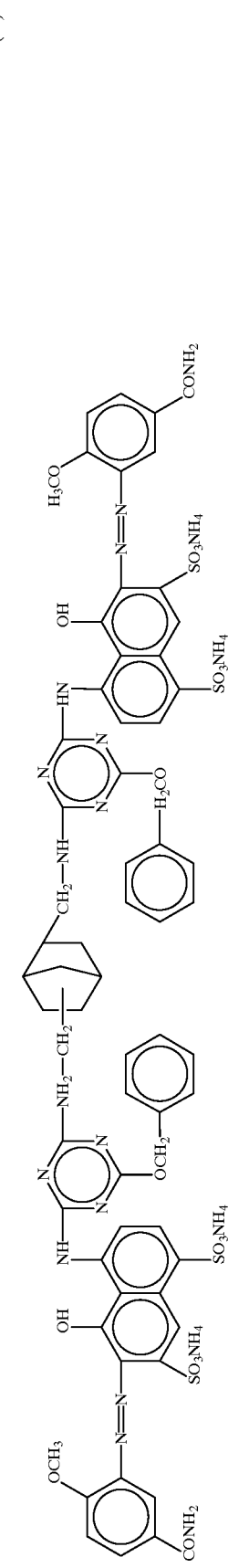
(20) 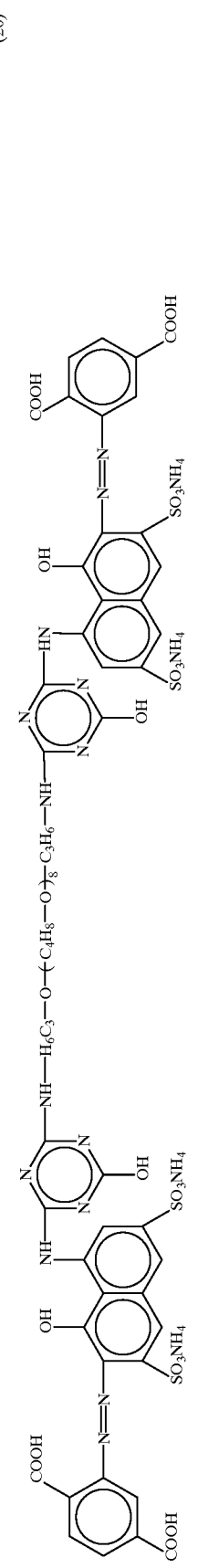
(21) 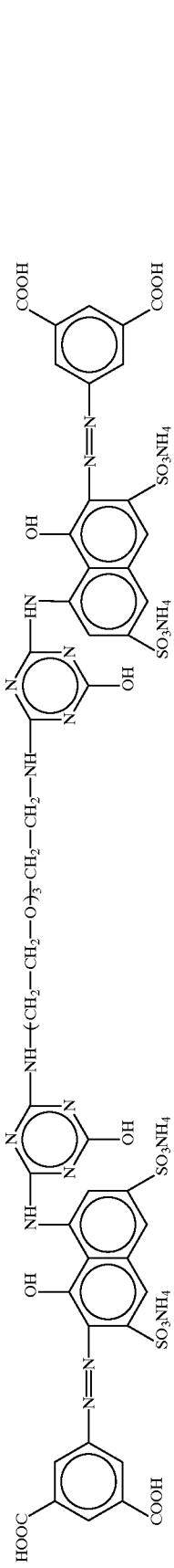

(22) 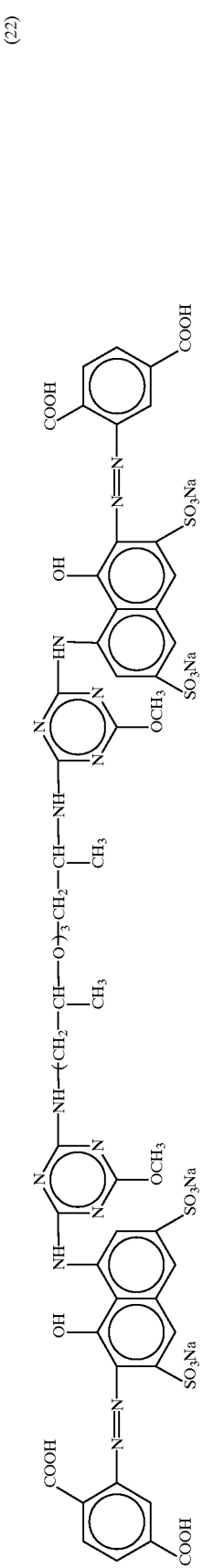
(23) 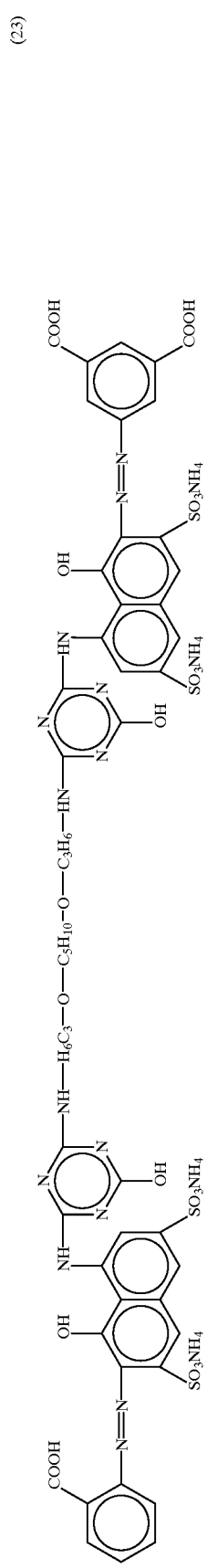
(24) 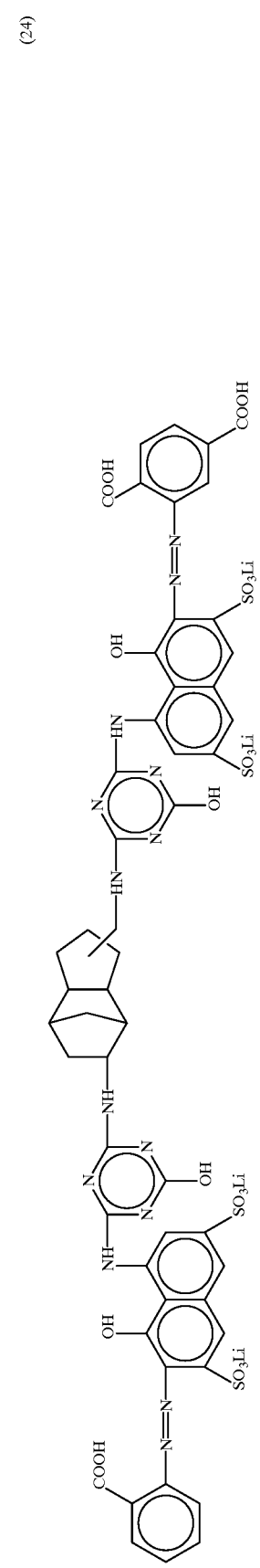
(25) 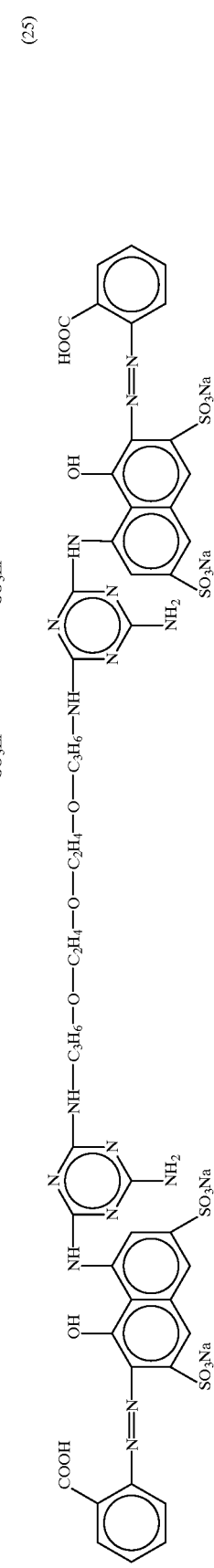

-continued
(26) 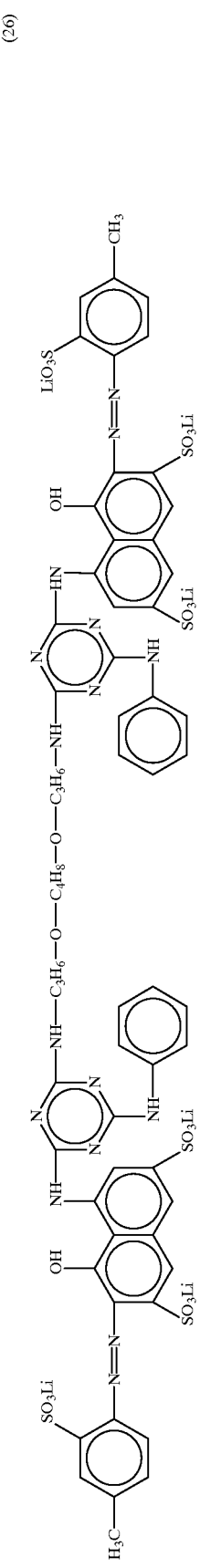
(27) 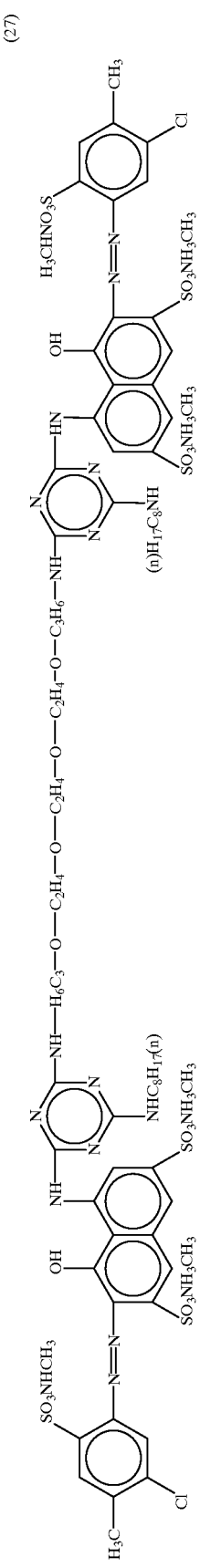
(28) 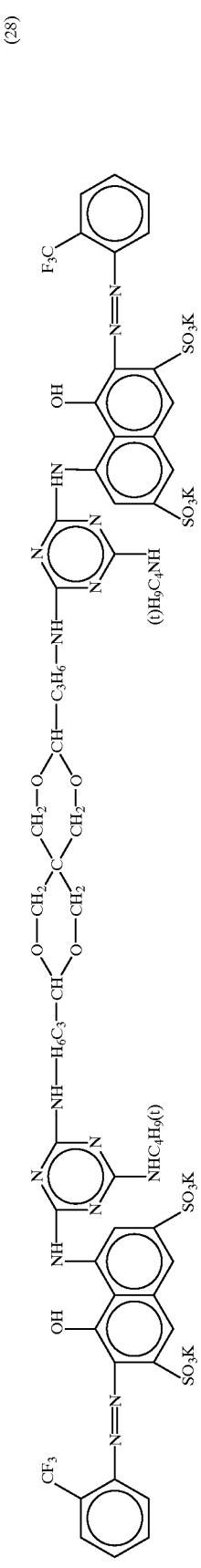
(29) 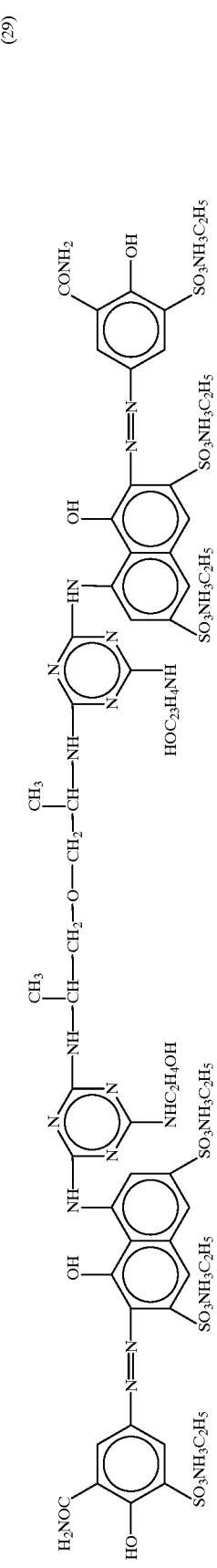

(30) 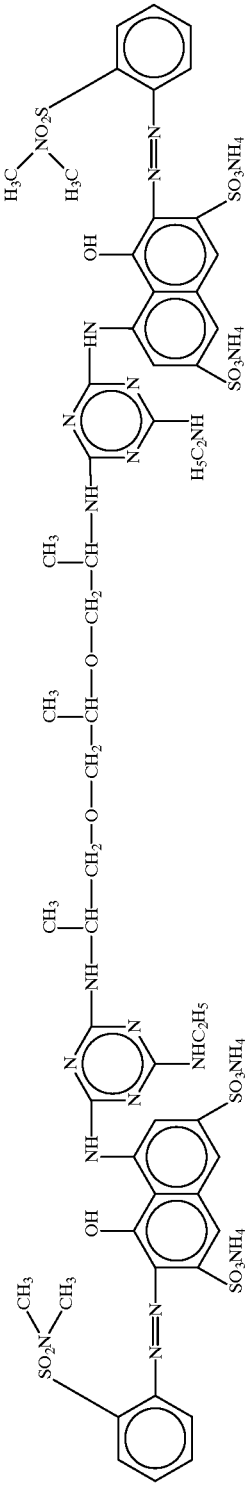
(31) 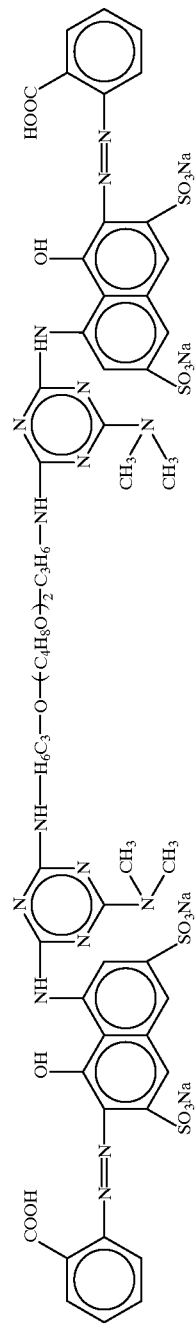
(32) 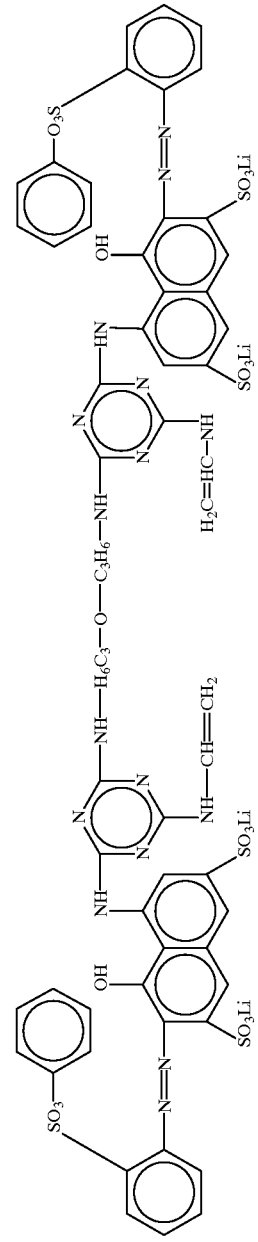
(33) 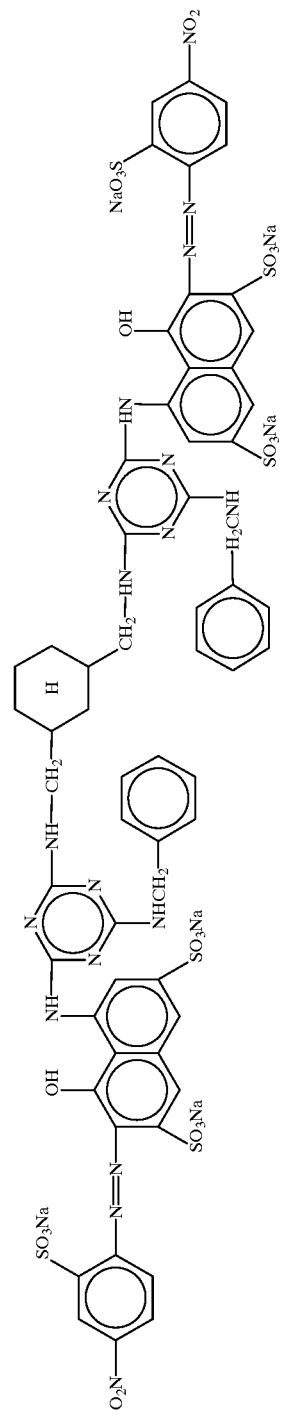

(34) 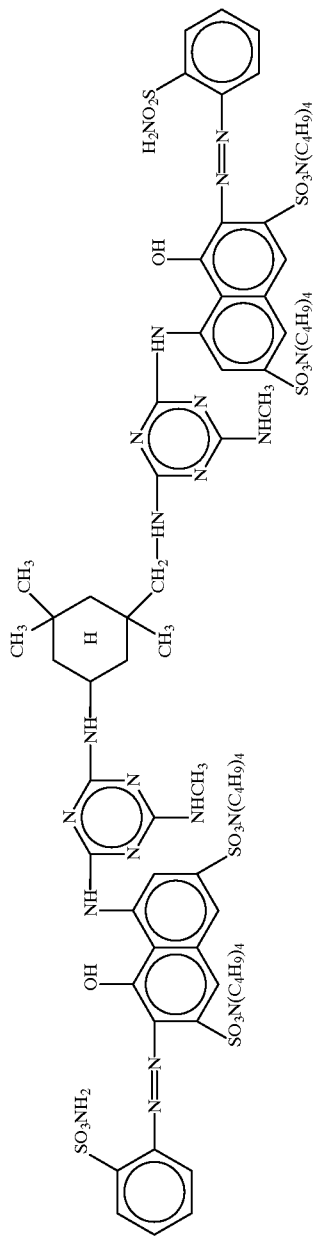 (35) 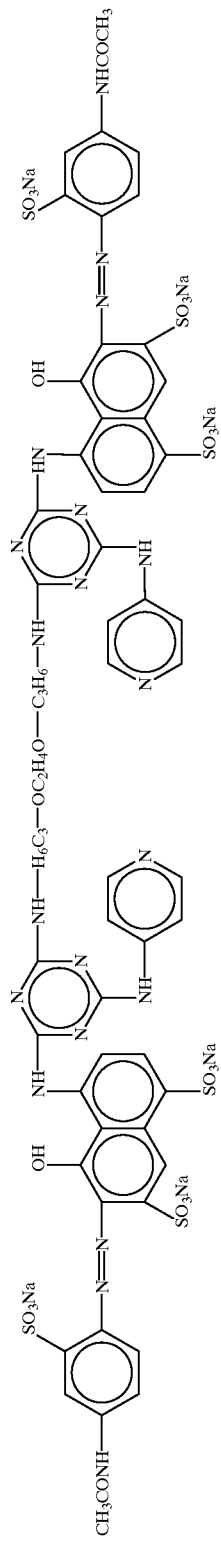 (36) 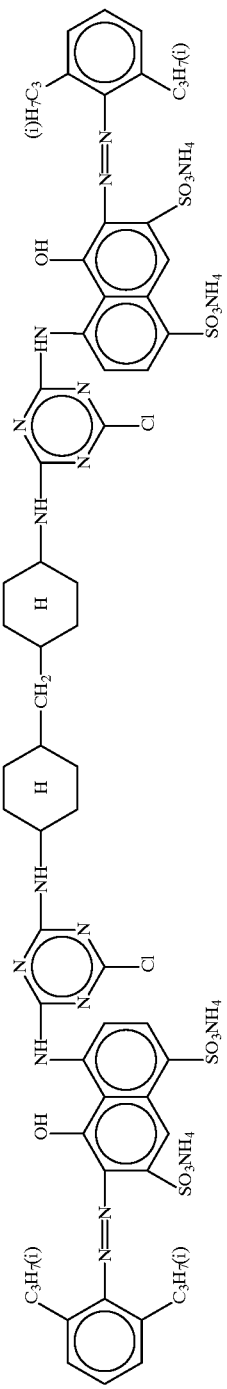

(37) 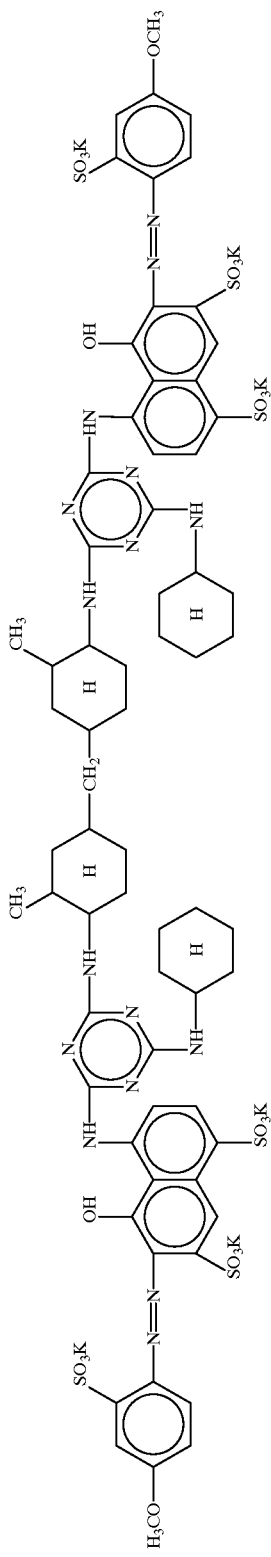
(38) 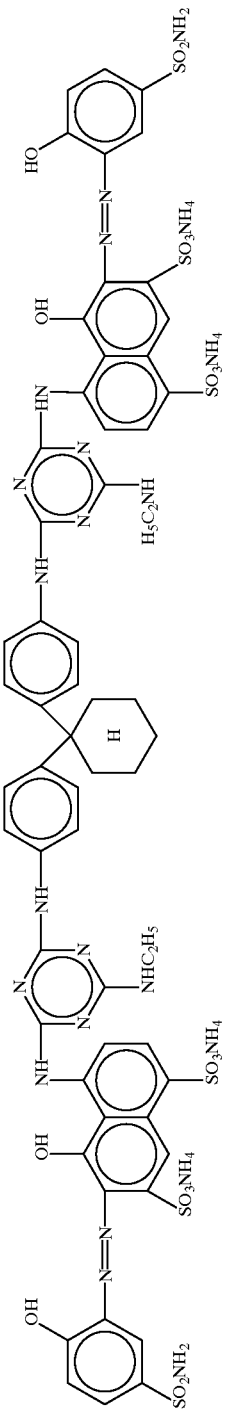
(39) 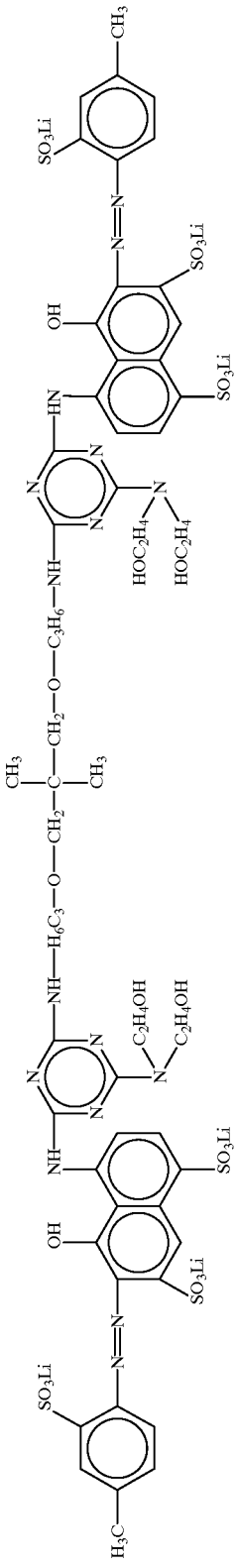
(40) 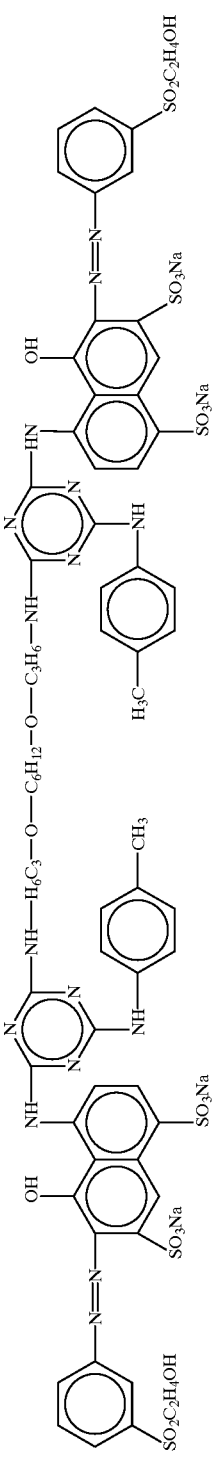

-continued
(41) 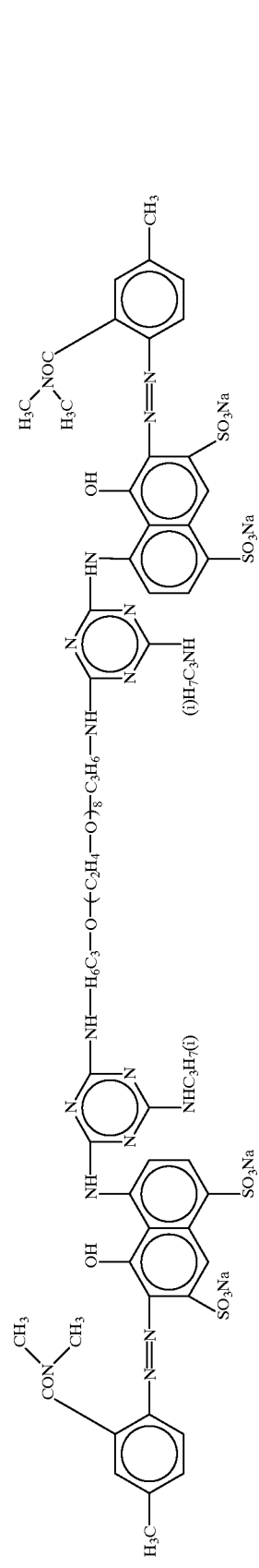
(42) 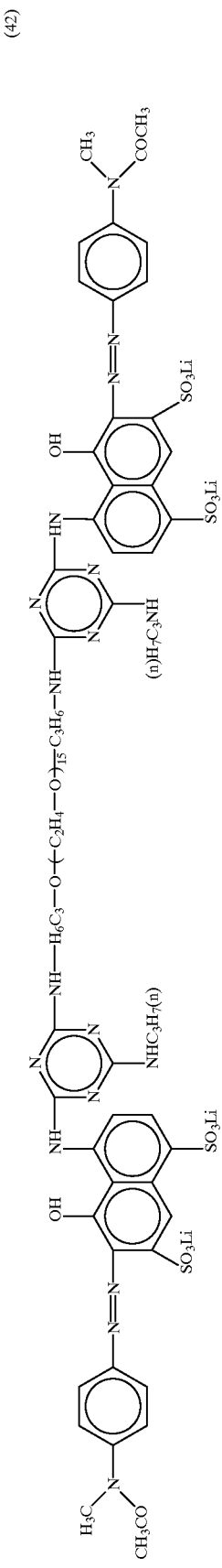
(43) 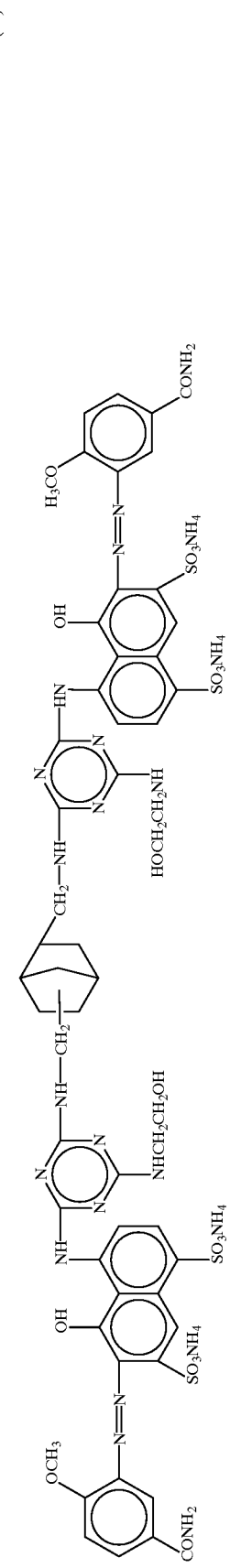
(44) 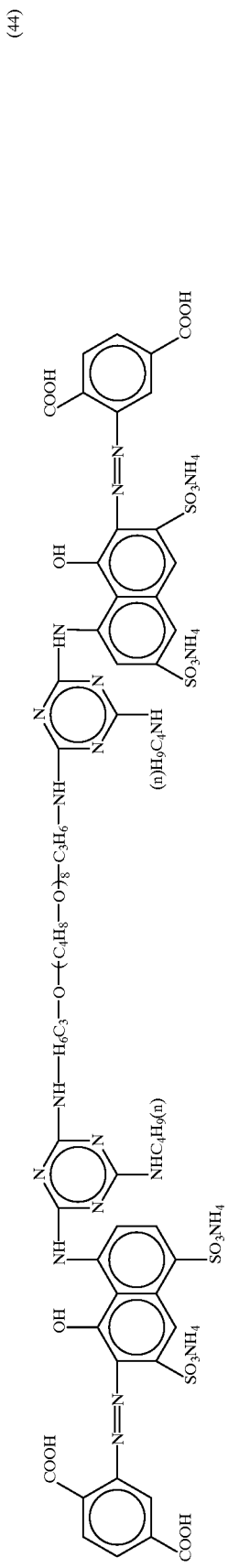

(45) (46) (47) (48)
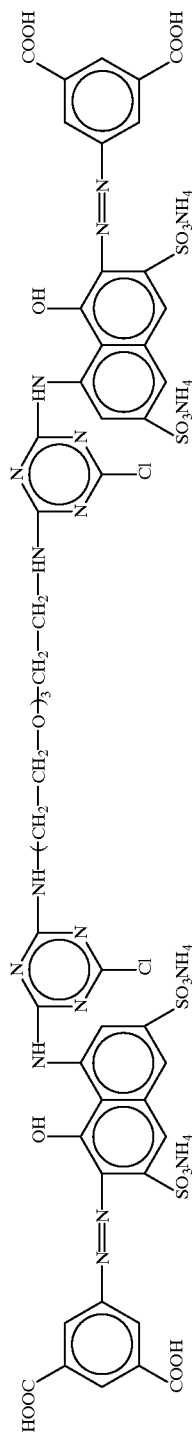
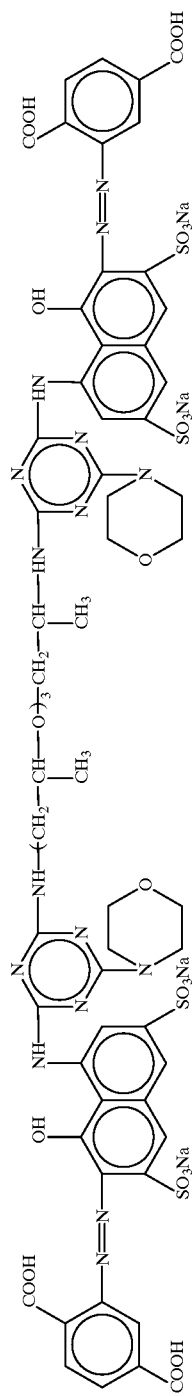
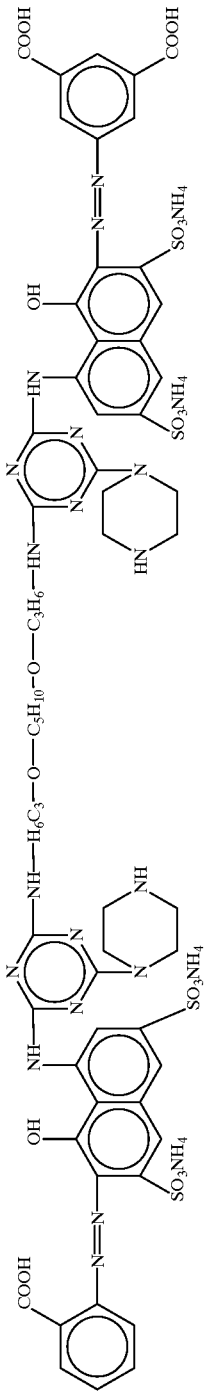
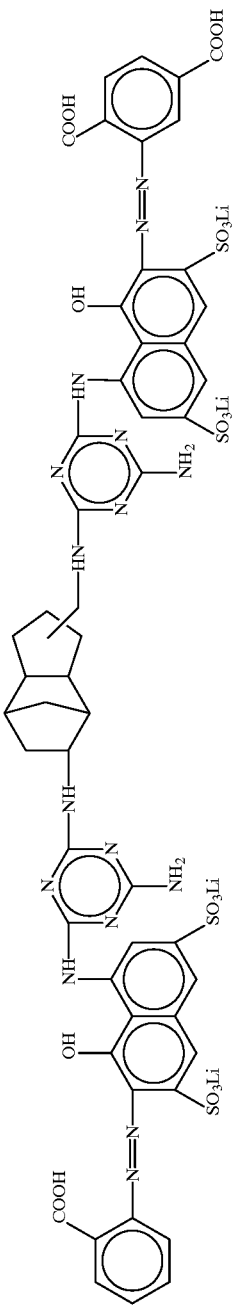

(49) 
(50) 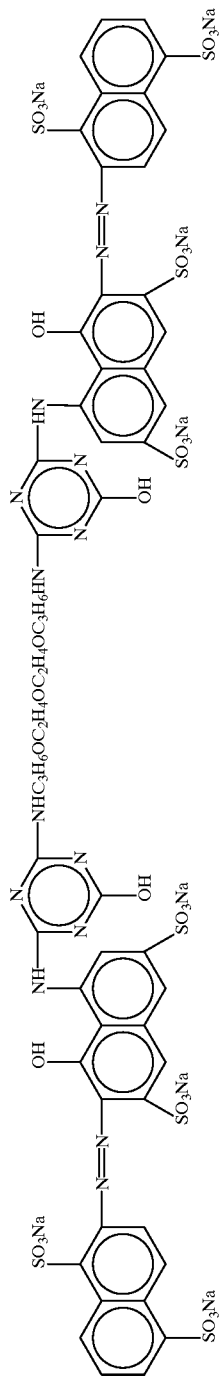
(51) 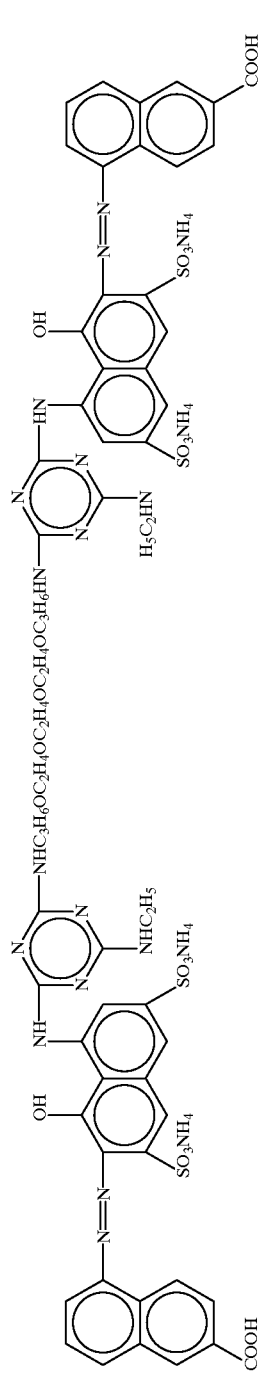
(52) 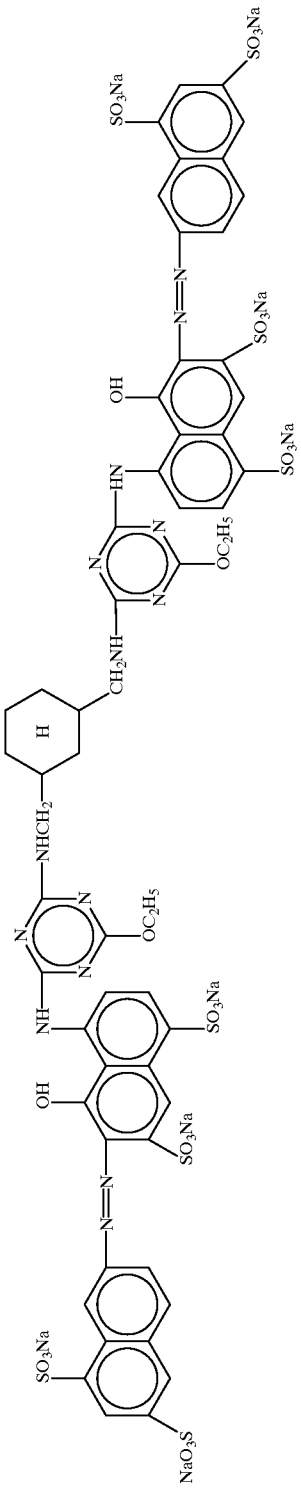

The dye represented by formula (I) can be produced by a known method.

For example, Dye No. (1) can be produced through the following steps (A) and (B).

(A) A monoazo compound is produced from 2-aminobenzoic acid and 1-amino-8-hydroxy-3,6-naphthalenedisulfonic acid (H acid) according to an ordinary method (see, for example, Yutaka Hosoda, *Shin Senryo Kagaku (New Dye Chemistry)*, pp. 396–409, Gihodo (Dec. 21, 1973)) through diazotization coupling process.

(B) The monoazo compound obtained is added to a cyanuric chloride suspension while keeping a pH of from 4 to 6 and a temperature of from 0 to 5° C. and reacted for several hours. Then, diethylene glycol bis(3-aminopropyl) ether is added in a molar ratio of 0.5 to the monoazo compound at room temperature in a weak alkaline condition.

Thereafter, a 25% aqueous sodium hydroxide solution is added at from 50 to 60° C. to effect hydrolysis and the resulting solution is cooled and salted out with sodium chloride to obtain the objective dye.

Dye No. (25) can be produced by passing through the following step (C) in place of the step (B).

(C) The monoazo compound obtained is added to a cyanuric chloride suspension while keeping a pH of from 4 to 6 and a temperature of from 0 to 5° C. and reacted for several hours. Then, diethylene glycol bis(3-aminopropyl) ether is added in a molar ratio of 0.5 to the monoazo compound at room temperature in a weak alkaline condition.

Thereafter, 28% aqueous ammonia is added, the temperature is elevated to from 60 to 70° C., and after completion of the reaction, the solution is cooled and salted out with sodium chloride to obtain the objective dye.

The recording liquid of the present invention preferably contains dyes including at least one dye selected from the dyes represented by formula (I) as the coloring agent in a total amount of from 0.5 to 8 wt %, more preferably from 2 to 5 wt %, based on the entire weight of the recording liquid.

The aqueous medium for use in the present invention preferably contains water and a water-soluble organic solvent such as ethylene glycol, propylene glycol, butylene glycol, diethylene glycol, triethylene glycol, polyethylene glycol (weight average molecular weight: approximately from 190 to 400), glycerin, N-methylpyrrolidone, N-ethylpyrrolidone, 1,3-dimethylimidazoldinone, thiodiethanol, dimethylsulfoxide, ethylene glycol monoallyl ether, ethylene glycol monomethyl ether, diethylene glycol monomethyl ether, 2-pyrrolidone, sulfolane, ethyl alcohol and isopropanol. The water-soluble organic solvent is usually used in an amount of from 1 to 50 wt % based on the entire weight of the recording liquid. On the other hand, water is used in an amount of from 45 to 95 wt % based on the entire weight of the recording liquid.

The recording liquid of the present invention may contain a compound selected from urea, thiourea, biuret and semicarbazide, in an amount of from 0.1 to 10 wt%, preferably from 0.5 to 5 wt %, based on the entire weight of the recording liquid, or a surface active agent in an amount of from 0.001 to 5.0 wt % based on the entire weight of the recording liquid, so that the quick drying property and printing appearance grade can be further improved.

The recording liquid of the present invention is preferably used while keeping the pH at from 5 to 11, more preferably from 6 to 10, so as to further improve the storage stability of the recording liquid.

The present invention is described in greater detail below by referring to the Examples, however, the present invention should not be construed as being limited thereto and may be modified unless it does not depart from the scope of the present invention.

EXAMPLE 1

Water was added to 10 parts by weight of diethylene glycol, 3 parts by weight of isopropyl alcohol and 3 parts by weight of Dye No. (1) (maximum absorption wavelength $\lambda$max=513 nm), and the pH was adjusted to 9 with 5 wt % of aqueous ammonia, to make 100 parts by weight in total. The resulting composition was thoroughly mixed and dissolved, pressure-filtered through a Teflon (trademark) filter having a hole size of 1 $\mu$m and then deaerated by a vacuum pump and an ultrasonic cleaner to prepare a recording liquid.

Ink jet recording was performed using the recording liquid obtained on an electrophotographic sheet (produced by Xerox Corp.) or a dedicated coat paper (HR-101, produced by Canon) in an ink jet printer (BJC-610JW, trade name, manufactured by Canon). As a result, a magenta printed matter having a clear tone (saturation) was obtained and this printed matter was evaluated variously. The evaluation methods (a), (b), (c), (d) and (e) and the evaluation results are described below.

(a) Light Fastness of Recorded Image

The recorded sheet was subjected to irradiation for 100 hours using a xenon fade meter (manufactured by Suga Shikenki). The discoloration after the irradiation was small.

(b) Water Resistance of Recorded Image (Tested Only for Electrophotographic Sheet)

(1) Test Method

The recorded image was immersed in tap water for 5 minutes and then, (i) the blurring of the image was visually examined, and (ii) the OD (optical density) values on the solid printing part before and after the immersion were measured by a Macbeth densitometer (TR927, trade name, manufactured by Macbeth Co., Ltd.).

(2) Test Results

In (i), the image was scarcely blurred. The change in the density on the solid printing part before and after immersion in (ii) was 94.8% in terms of the OD residual ratio according to the following formula:

$$\text{OD residual ratio} = \frac{\text{OD value after immersion}}{\text{OD value before immersion}} \times 100 \ (\%)$$

(c) Storage Stability of Recording Liquid

The recording liquid was placed in a container made of Teflon (trademark) and the container was tightly closed. After storing at 5° C. or 60° C. for 1 month, the change was examined but precipitation of insoluble matters was not observed.

(d) Reliability of Recording Liquid (i) Clogging (Recovery from Sticking)

A predetermined ink was filled in a printer and left standing at 35° C. for 1 month. Thereafter, the ink was subjected to a recovery operation (suction operation by pumping) and then to printing. As a result, normal printing state was recovered.

(ii) Stability of Intermittent Jetting

A predetermined ink was filled in a printer and alphanumeric characters were printed continuously for 1 minute. Then, the printer was stopped and left standing for 1 minute while not having a cap or the like. Thereafter, printing was again performed. As a result, thinning or breaking of letters was not observed from the first character.

(e) Migration Property of Recorded Image (Tested Only for Dedicate Coat Paper)

A printed matter was left standing in a tank at 40° C. and 90% RH for 1 hour and blurring of the printed letters was visually examined. As a result, blurring of the printed letters were not observed at all.

EXAMPLE 2

Water was added to 5 parts by weight of glycerin, 10 parts by weight of ethylene glycol and 2.5 parts by weight of Dye No. (2), and the pH was adjusted to 9 with an aqueous lithium hydroxide solution, to make 100 parts by weight in total. The resulting composition was treated according to the method described in Example 1 to prepare a recording liquid. Printing was performed using the recording liquid obtained in the same manner as in Example 1. As a result, a magenta color recorded matter having a clear tone (saturation) was obtained. This recorded matter was evaluated on the items (a) to (e) of Example 1 and good results were obtained in any of these items similarly to Example 1.

The OD residual ratio was 95.5%.

EXAMPLES 3 AND 4

Recording liquids were prepared in the same manner as in Example 1 except for using Dye No. (3) or Dye No. (4) in place of 3 parts by weight of Dye No. (1) used in Example 1. Printing was performed using each recording liquid and the recorded matters were evaluated on the items (a) to (e) of Example 1. As a result, good results were obtained in any of these items similarly to Example 1.

The OD residual ratios were 90.3% and 92.1%, respectively.

obtained and the recorded matter was evaluated on the items (a) to (e) of Example 1. As a result, good results were obtained in any of these items similarly to Example 1.

The OD residual ratio was 92.8%.

EXAMPLES 6 TO 24

Recording liquids were prepared in the same manner as in Example 1 except for using one of Dye Nos. (5) to (19) and Nos. (21) to (24) in place of Dye No. (1) used in Example 1. Printing was performed using each recording liquid and the recorded matters were evaluated on the items (a) to (e) of Example 1. As a result, good results were obtained in any of these items similarly to Example 1.

The OD residual ratio in the case of using Dye No. (5) (Example 6) was 94.1%.

Comparative Example 1

A recording liquid was prepared in the same manner as in Example 1 except for using Dye (A) shown below in place of Dye No. (1) used in Example 1. Printing was performed using the recording liquid obtained and the recorded matter was evaluated on the items (a) to (e) of Example 1.

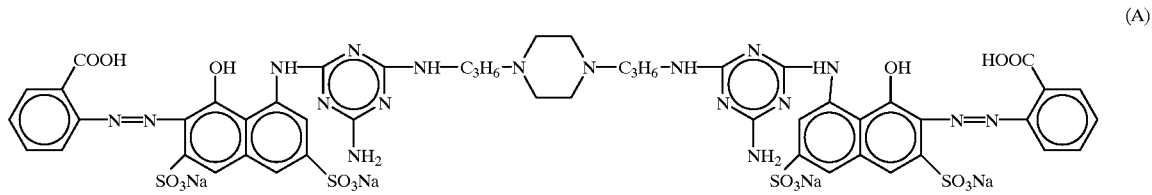

(A)

Comparative Example 2

A recording liquid was prepared in the same manner as in Example 1 except for using the following Dye (B) used in Example 2 of International Publication WO 94/16021, in place of Dye No. (1) used in Example 1. Printing was performed using the recording liquid obtained and the recorded matter was evaluated on the items (a) to (e) of Example 1.

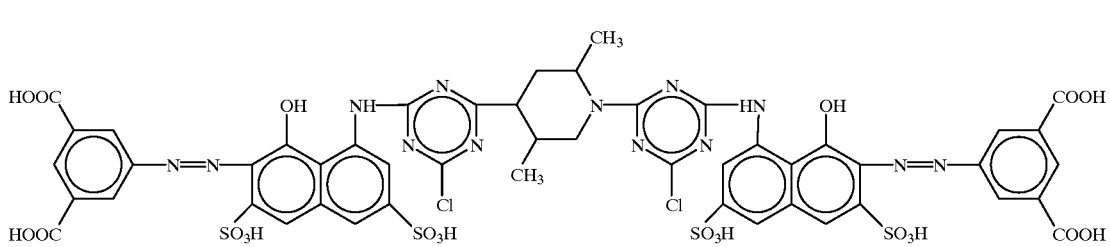

(B)

EXAMPLE 5

A recording liquid was prepared in the same manner as in Example 1 except for using a mixture of 1.5 parts by weight of Dye No. (1) and 1.5 parts by weight of Dye No. (20) in place of 3 parts by weight of Dye No. (1) used in Example 1. Printing was performed using the recording liquid

Comparative Example 3

A recording liquid was prepared in the same manner as in Example 1 except for using the following Dye (C) which is a compound described in Example 5 of JP-A-4-279671 where Z is an OH group, in place of Dye No. (1) used in Example 1. Printing was performed using the recording liquid obtained and the recorded matter was evaluated on the items (a) to (e) of Example 1.

method described in Example 1 to prepare a recording liquid. Printing was performed using the recording liquid

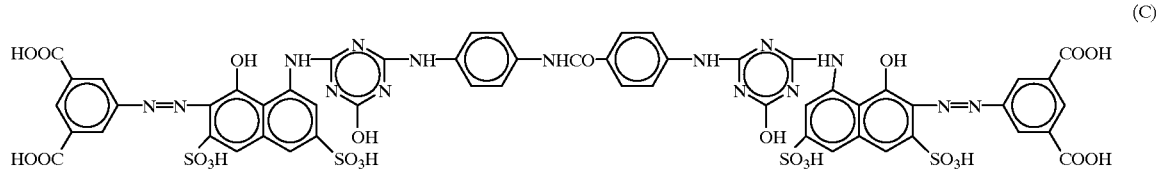
(C)

Comparative Example 4

A recording liquid was prepared in the same manner as in Example 1 except for using the following Dye (D) used in the Example of JP-A-8-218021, in place of Dye No. (1) used in Example 1. Printing was performed using the recording liquid obtained and the recorded matter was evaluated on the items (a) to (e) of Example 1.

obtained in the same manner as in Example 1. As a result, a magenta color recorded matter having a clear tone (saturation) was obtained. This recorded matter was evaluated on the items (a) to (e) of Example 1 and good results were obtained in any of these items similarly to Example 1.

The OD residual ratio was 96.3%.

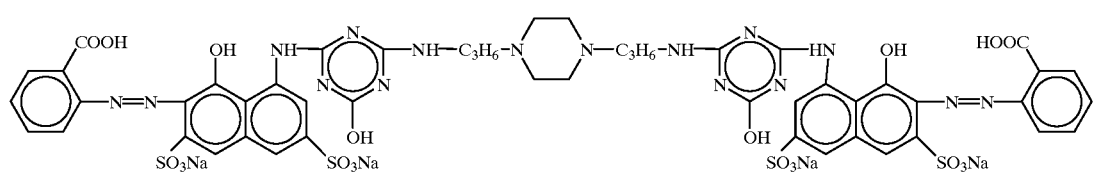
(D)

Comparative Example 5

A recording liquid was prepared in the same manner as in Example 1 except for using Dye (E) shown below in place of Dye No. (1) used in Example 1. Printing was performed using the recording liquid obtained and the recorded matter was evaluated on the items (a) to (e) of Example 1.

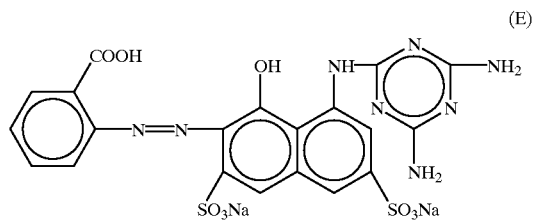
(E)

Example 25

A recording liquid was prepared in the same manner as in Example 1 except for using Dye No. (25) (maximum absorption wavelength $\lambda$max=516 nm) in place of Dye No. (1) used in Example 1. Printing was performed using the recording liquid and the recorded matter was evaluated on the items (a) to (e) of Example 1. Then, good results were obtained in any of these items similarly to Example 1.

The OD residual ratio was 95.1%.

EXAMPLE 26

Water was added to 5 parts by weight of glycerin, 10 parts by weight of ethylene glycol and 2.5 parts by weight of Dye No. (26), and the pH was adjusted to 9 with an aqueous lithium hydroxide solution, to make 100 parts by weight in total. The resulting composition was treated according to the

EXAMPLES 27 AND 28

Recording liquids were prepared in the same manner as in Example 1 except for using Dye No. (27) or Dye No. (28) in place of 3 parts by weight of Dye No. (1) used in Example 1. Printing was performed using each recording liquid and the recorded matters were evaluated on the items (a) to (e) of Example 1. As a result, good results were obtained in any of these items similarly to Example 1.

The OD residual ratios were 92.1% and 92.5%, respectively.

EXAMPLE 29

A recording liquid was prepared in the same manner as in Example 1 except for using a mixture of 1.5 parts by weight of Dye No. (25) and 1.5 parts by weight of Dye No. (44) in place of 3 parts by weight of Dye No. (1) used in Example 1. Printing was performed using the recording liquid obtained and the recorded matter was evaluated on the items (a) to (e) of Example 1. As a result, good results were obtained in any of these items similarly to Example 1.

The OD residual ratio was 89.8%.

EXAMPLES 30 TO 48

Recording liquids were prepared in the same manner as in Example 1 except for using one of Dye Nos. (29) to (43) and Nos. (45) to (48) in place of Dye No. (1) used in Example 1. Printing was performed using each recording liquid and the recorded matters were evaluated on the items (a) to (e) of Example 1. As a result, good results were obtained in any of these items similarly to Example 1.

The OD residual ratio in the case of using Dye No. (29) (Example 30) was 93.9%.

The results of Examples 1 to 6 and Comparative Examples 1 to 5 are together shown on Table 1 below.

Further, the results of Examples 25 to 30 are together shown in Table 2 below.

density of the image is scarcely reduced and only the image outline is slightly blurred, Δ: blotting is observed but the

TABLE 1

| No. | Electrophorographic Sheet | | | | Dedicated Coat Paper | | | Reliability | | |
|---|---|---|---|---|---|---|---|---|---|---|
| | Tone (saturation) | Light Fastness | Water Resistance Blotting | OD residual ratio (%) | Tone (saturation) | Light Fastness | Migration | Storage Stability | Clogging (sticking) | Stablility of Intermittent Jetting |
| Example 1 | ○ | ○ | ○ | 94.8 | ○ | ○ | ○ | ○ | ○ | ○ |
| Example 2 | ○ | ○ | ○ | 95.5 | ○ | ○ | ○ | ○ | ○ | ○ |
| Example 3 | ○ | ○ | ○ | 90.3 | ○ | ○ | ○ | ○ | ○ | ○ |
| Example 4 | ○ | ○ | ○ | 92.1 | ○ | ○ | ○ | ○ | ○ | ○ |
| Example 5 | ○ | ○ | ○ | 92.8 | ○ | ○ | ○ | ○ | ○ | ○ |
| Example 6 | ○ | ○ | ○ | 94.1 | ○ | ○ | ○ | ○ | ○ | ○ |
| Comparative Example 1 | Δ | Δ | ○ | 94.5 | ○ | Δ | ○ | ○ | Δ | Δ |
| Comparative Example 2 | ○ | Δ | Δ | 66.4 | ○ | Δ | ○ | ○ | X | Δ |
| Comparative Example 3 | Δ | X | ○ | 84.0 | ○ | Δ | ○ | Δ | Δ | Δ |
| Comparative Example 4 | ○ | ○ | ○ | 93.1 | ○ | ○ | ○ | ○ | Δ | Δ |
| Comparative Example 5 | ○ | ○ | Δ | 46.2 | ○ | ○ | X | ○ | ○ | ○ |

TABLE 2

| No. | Electrophorographic Sheet | | | | Dedicated Coat Paper | | | Reliability | | |
|---|---|---|---|---|---|---|---|---|---|---|
| | Tone (saturation) | Light Fastness | Water Resistance Blotting | OD residual ratio (%) | Tone (saturation) | Light Fastness | Migration | Storage Stability | Clogging (sticking) | Stablility of Intermittent Jetting |
| Example 25 | ○ | ○ | ○ | 95.1 | ○ | ○ | ○ | ○ | ○ | ○ |
| Example 26 | ○ | ○ | ○ | 96.3 | ○ | ○ | ○ | ○ | ○ | ○ |
| Example 27 | ○ | ○ | ○ | 92.1 | ○ | ○ | ○ | ○ | ○ | ○ |
| Example 28 | ○ | ○ | ○ | 92.5 | ○ | ○ | ○ | ○ | ○ | ○ |
| Example 29 | ○ | ○ | ○ | 89.8 | ○ | ○ | ○ | ○ | ○ | ○ |
| Example 30 | ○ | ○ | ○ | 93.9 | ○ | ○ | ○ | ○ | ○ | ○ |

In Tables 1 and 2, the tone is shown by the color saturation of the image. More specifically, the tone of the recorded image was measured by a color-difference meter (SZ-Σ80, trade name, manufactured by Nippon Denshoku Kogyo KK) using CIE1976 (L* a* b*) calorimetric system to determine the L*, a* and b* values and these values were applied to the following formula:

$$\sqrt{a^{*2} + b^{*2}}$$

In the case of an electrophotographic sheet, ○: the value obtained above is 60 or more, Δ: the value is from 55 to less than 60, and X: the value is less than 55.

In the case of a dedicated coat paper, ○: the value obtained above is 70 or more, Δ: the value is from 65 to less than 70, and X: the value is less than 65.

With respect to the light fastness, ○: discoloration is scarcely observed with an eye, Δ: discoloration is somewhat observed with an eye, and X: impractical level with conspicuous discoloration.

With respect to the blotting in the water resistance, ○: from the state where blotting is scarcely observed with an eye to the state where blotting is slightly observed but the blotted range is small and the reduction in the image density is small, and X: conspicuous blotting and impractical level such that the blotted range is large and the original image area can be difficultly identified.

With respect to the storage stability, when the recording liquid is sampled into a testing tube and observed, ○: insoluble matters are not observed at all, Δ: insoluble matters are slightly observed, and X: insoluble matters are outstanding and impractical level.

In the reliability of the recording liquid, with respect to (i) clogging (recovery from sticking), ○: normal printing state is recovered by the recovering operation of 2 or less times, Δ: normal printing state is recovered by the recovering operation of 3 to 4 times, X: jetting failure or printing disorder is generated even after the recovering operation of 5 or more times.

With respect to (ii) stability of intermittent jetting, ○: no thinning or breaking occurs from the first character, Δ: first character is partly thinned or broken, and X: the first character cannot be printed by any means.

With respect to the migration of the recording image, ○: letters on the printed matter are not blurred at all, Δ: letters on the printed matter are slightly blurred, and X: the letters on the printed matter are blurred.

The recording liquid of the present invention is suitable for the ink jet recording or as a writing instrument and when recording is made using the recording liquid on a plain paper or dedicate paper, a clear magenta dye recorded material can be obtained with excellent printing density, light fastness and water resistance on the plain paper or dedicate paper, and migration on the dedicate paper. The recording liquid has high reliability and good storage stability.

While the invention has been described in detail and with reference to specific embodiments thereof, it will be apparent to one skilled in the art that various changes and modifications can be made therein without departing from the spirit and scope thereof.

What is claimed is:

1. A recording liquid comprising an aqueous medium and at least one dye selected from the group consisting of dyes of which free acid form is represented by the following formula (I):

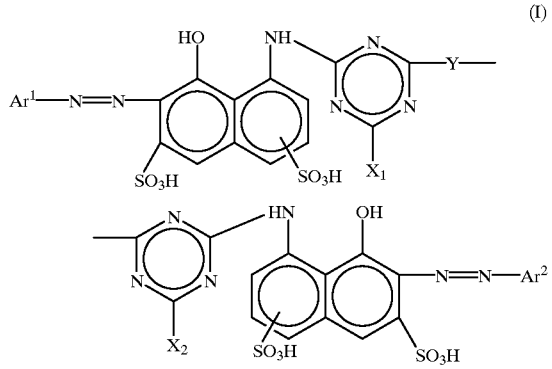

(I)

wherein $Ar^1$ and $Ar^2$ each independently represents a substituted or unsubstituted phenyl group or a substituted or unsubstituted naphthyl group; $X_1$ and $X_2$ each represents —$OR_1$; $R_1$, $R_2$ and $R_3$ each represents a hydrogen atom, an alkyl group having from 1 to 8 carbon atoms, an alkenyl group having 2 or 3 carbon atoms, an aryl group, an aralkyl group, a cyclohexyl group or a nitrogen-containing heterocyclic group, provided that these groups exclusive of the hydrogen atom each may have at least one substituent and $R_2$ and $R_3$ may form a 5- or 6-membered ring together with the nitrogen atom bonded thereto; and Y represents a divalent linking group selected from the groups consisting of formulae (II) to (IV) and the groups in Group A:

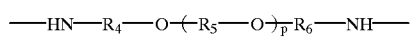

(II)

wherein $R_4$ and $R_6$ each independently represents a linear or branched alkylene group having from 1 to 8 carbon atoms; $R_5$ represents a linear or branched alkylene group having from 1 to 12 carbon atoms or the following formula (a):

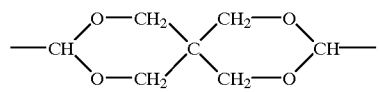

(a)

and p represents a number of from 0 to 20,

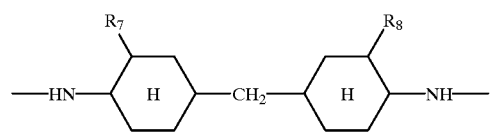

(III)

wherein $R_7$ and $R_8$ each represents a hydrogen atom or a methyl group,

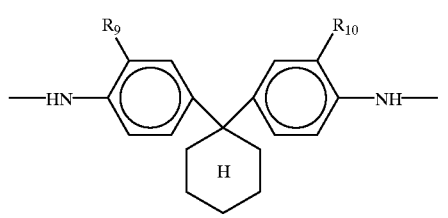

(IV)

wherein $R_9$ and $R_{10}$ each represents a hydrogen atom, a methyl group or a methoxy group, (Group A)

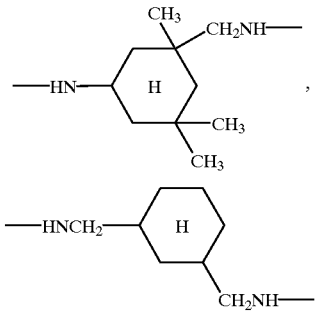

(Group A)

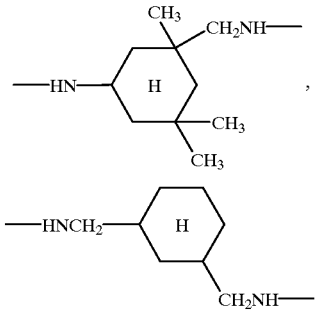

2. The recording liquid as claimed in claim 1, wherein the dye represented by formula (I) is a dye represented by the following formula (I'):

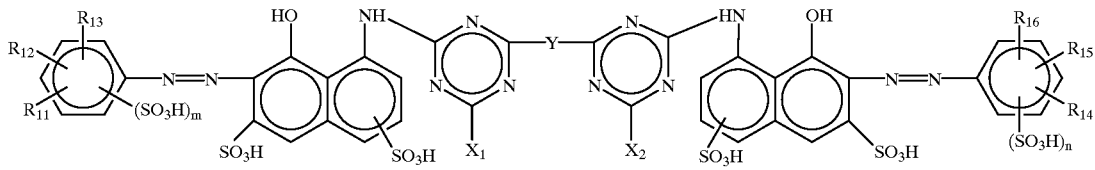

wherein $R_{11}$, $R_{12}$, $R_{13}$, $R_{14}$, $R_{15}$ and $R_{16}$ each independently represents a substituted or unsubstituted alkyl group having from 1 to 9 carbon atoms, a substituted or unsubstituted alkoxy group having from 1 to 9 carbon atoms, a halogen atom, a hydrogen atom, a hydroxyl group, a substituted or unsubstituted carbamoyl group, a substituted or unsubstituted sulfamoyl group, a substituted or unsubstituted amino group, a nitro group, a sulfonic acid ester group, a sulfonyl group, a carboxyl group or a carboxylic acid ester group; m an n each represents a number of 0, 1 or 2; and $X_1$, $X_2$ and Y have the same meanings as defined in formula (I).

3. The recording liquid as claimed in claim 1, wherein in the dye represented by formula (I), each of the naphthyl groups represented by $Ar^1$ or $Ar^2$ has at least one group selected from a sulfo group and a carboxyl group as a substituent.

4. The recording liquid as claimed in claim 3, wherein the total number of the sulfo group or groups and the carboxyl group or groups substituted on said each of the naphthyl groups is from 1 to 7.

5. The recording liquid as claimed in claim 2, which contains at least one dye selected from the dyes having a structure such that the number of carboxyl groups (COOH group) in $R_{11}$ to $R_{16}$ of formula (I') is 3 or less.

6. The recording liquid as claimed in claim 2, which contains at least one dye selected from the dyes having a structure such that in formula (I'), m and n each is 1 and the $SO_3H$ group bonded to the phenyl group is in the ortho-position to the bonding site of the azo group.

7. The recording liquid as claimed in claim 2, which contains at least one dye selected from dyes having a structure such that in formula (I'), m and n is 0; and at least one of $R_{11}$ to $R_{13}$ and at least one of $R_{14}$ to $R_{16}$ are a hydrogen atom, at least one of $R_{11}$ to $R_{13}$ and at least one of $R_{14}$ to $R_{16}$ are a group selected from a trifluoromethyl group, a substituted or unsubstituted sulfamoyl group, a lower alkyl ester group of sulfonic acid, an aryl ester group of sulfonic acid, a COOH group and a lower alkyl ester group of carboxylic acid, and the site of the groups bonding to respective phenyl groups is in the ortho-position to the bonding site of the azo group.

8. The recording liquid as claimed in claim 2, which contains at least one dye selected from the dyes having a structure such that in formula (I'), the groups represented by the formulae:

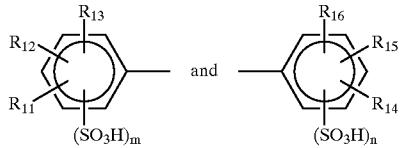

are the groups represented by the formulae:

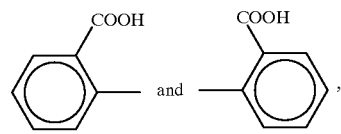

respectively.

9. The recording liquid as claimed in claim 1, which contains at least one dye selected from the dyes having a structure such that in formula (I), the group represented by $X_1$ or $X_2$ is an OH group.

10. The recording liquid as claimed in claim 1, which contains at least one dye selected from the dyes having a structure such that in formula (I), the groups represented by the formulae:

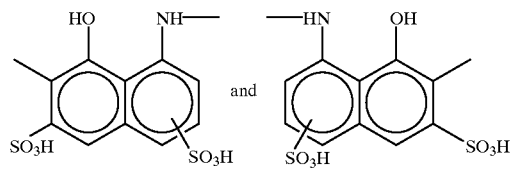

are the groups represented by the formulae:

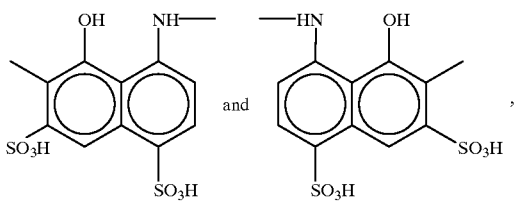

respectively.

11. The recording liquid as claimed in claim 1, which contains at least one dye selected from the dyes having a structure such that in formula (I), the groups represented by the formulae:

are the groups represented by the formulae:

[chemical structures]

respectively.

12. The recording liquid as claimed in claim 1, which contains at least one dye selected from the dyes represented by formula (I) in an amount of from 0.5 to 8 wt % in total based on the entire weight of the recording liquid.

13. A water-soluble dye of which free acid form is represented by the following formula (I):

[structure of formula (I)]

wherein $Ar^1$ and $Ar^2$ each independently represents a substituted or unsubstituted phenyl group or a substituted or unsubstituted naphthyl group; $X_1$ and $X_2$ each represents —$OR_1$; $R_1$, $R_2$ and $R_3$ each represents a hydrogen atom, an alkyl group having from 1 to 8 carbon atoms, an alkenyl group having 2 or 3 carbon atoms, an aryl group, an aralkyl group, a cyclohexyl group or a nitrogen-containing heterocyclic group, provided that these groups exclusive of the hydrogen atom each may have at least one substituent and $R_2$ and $R_3$ may form a 5- or 6-membered ring together with the nitrogen atom bonded thereto; and Y represents a divalent linking group selected from the group consisting of formulae (II) to (IV) and the groups in Group A:

[structure (a)]

wherein $R_4$ and $R_6$ each independently represents a linear or branched alkylene group having from 1 to 8 carbon atoms; $R_5$ represents a linear or branched alkylene group having from 1 to 12 carbon atoms or the following formula (a):

[structure (a)]

and p represents a number of from 0 to 20,

[structure (III)]

wherein $R_7$ and $R_8$ each represents a hydrogen atom or a methyl group,

[structure (IV)]

wherein $R_9$ and $R_{10}$ each represents a hydrogen atom, a methyl group or a methoxy group, 51
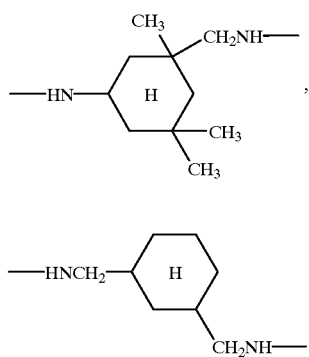
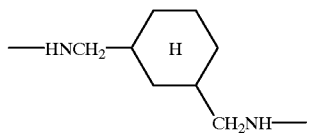
52
-continued
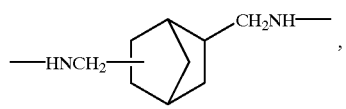
* * * * *